US012600239B2

(12) United States Patent
Kong et al.

(10) Patent No.: US 12,600,239 B2
(45) Date of Patent: Apr. 14, 2026

(54) DRIVE APPARATUS AND ELECTRIC VEHICLE

(71) Applicant: Huawei Digital Power Technologies Co., Ltd., Futian District (CN)

(72) Inventors: Xuejuan Kong, Dongguan (CN); Yang Zhao, Shenzhen (CN); Xin Wu, Xi'an (CN); Yankun Xu, Xi'an (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 348 days.

(21) Appl. No.: 18/304,597

(22) Filed: Apr. 21, 2023

(65) Prior Publication Data

US 2023/0347745 A1 Nov. 2, 2023

(30) Foreign Application Priority Data

Apr. 29, 2022 (CN) .......................... 202210472657.2

(51) Int. Cl.
| | |
|---|---|
| *B60L 3/00* | (2019.01) |
| *B60W 10/08* | (2006.01) |
| *G06F 1/24* | (2006.01) |
| *G06F 11/07* | (2006.01) |

(52) U.S. Cl.
CPC ........... *B60L 3/0061* (2013.01); *B60W 10/08* (2013.01); *G06F 1/24* (2013.01); *G06F 11/0757* (2013.01)

(58) Field of Classification Search
None
See application file for complete search history.

(56) References Cited

U.S. PATENT DOCUMENTS

2001/0027537 A1* 10/2001 Nada ..................... B60W 10/06
903/947
2020/0272481 A1* 8/2020 Oishi .................. G06F 11/3082

FOREIGN PATENT DOCUMENTS

| CN | 102431549 A | 5/2012 |
|---|---|---|
| CN | 104820623 B | 4/2018 |
| JP | 2015111187 A | 6/2015 |

* cited by examiner

*Primary Examiner* — Anshul Sood
*Assistant Examiner* — Wenyuan Yang
(74) *Attorney, Agent, or Firm* — Maier & Maier, PLLC

(57) ABSTRACT

A drive apparatus and an electric vehicle are provided to implement fault monitoring functions of two control chips when one watchdog chip is configured. The drive apparatus includes a first control chip, a second control chip, a first drive circuit, a second drive circuit, a watchdog chip, and a reset shutdown circuit. The first drive circuit generates a drive signal of a first inverter. The second drive circuit generates a drive signal of a second inverter. The first control chip and the second control chip perform fault monitoring on each other.

8 Claims, 17 Drawing Sheets

First side wheel 13

Second side wheel 14

Electric vehicle

DRIVE APPARATUS AND ELECTRIC VEHICLE

CROSS-REFERENCE TO RELATED APPLICATION

This application claims priority to Chinese Patent Application No. 202210472657.2, filed on Apr. 29, 2022, which is hereby incorporated by reference in its entirety.

TECHNICAL FIELD

The embodiments may relate to the field of power electronics technologies, a drive apparatus, and an electric vehicle.

BACKGROUND

An electric vehicle may include wheels, a motor, an inverter, and a drive apparatus. The inverter is connected to the motor, and supplies power to the motor based on a drive signal sent by the drive apparatus, to control the motor to output proper drive torque to drive the electric vehicle to run. Drive torque safety is one of important functional safety objectives of the electric vehicle. As a requirement for functional safety of the electric vehicle is increasingly high, the drive apparatus needs to meet a safety level, to ensure running safety of the electric vehicle.

The drive apparatus in the electric vehicle may be provided with a watchdog chip, a control chip, and a drive circuit. The control chip may be configured to calculate drive torque required by the electric vehicle, and the drive circuit generates a drive signal of the inverter based on the received torque. When receiving the drive signal, the inverter supplies power to the motor and drives the electric vehicle to run. The watchdog chip performs fault monitoring on the control chip based on a watchdog feeding signal sent by the control chip. When it is determined that the control chip is faulty, the drive circuit shuts down some or all switches in the inverter to shut down the drive torque, and resets the control chip, so that the electric vehicle is in a safe state.

To meet the safety level, the drive apparatus also needs to use a watchdog chip of the safety level. For a hybrid electric vehicle or a four-drive electric vehicle, the electric vehicle includes two motors, and one corresponding drive apparatus is configured for each motor. Therefore, the electric vehicle needs to be configured with two watchdog chips of the safety level, so that fault monitoring can be performed on control chips required by the two motors. The safety level of the watchdog chip is one of important factors that restrict costs of the watchdog chip. Therefore, currently, a driving solution of the electric vehicle needs to be further studied.

SUMMARY

The embodiments may provide a drive apparatus and an electric vehicle. When one watchdog chip is configured, fault monitoring functions of two control chips are implemented, to meet a safety requirement of the drive apparatus.

According to a first aspect, the embodiments may provide a drive apparatus, used in an electric vehicle. The electric vehicle may include a first motor, a second motor, a first inverter configured to supply power to the first motor, a second driver configured to supply power to the second motor, and the drive apparatus. The drive apparatus may adjust, by providing a drive signal to an inverter that supplies power to a motor, a drive torque value output by the motor, and control running of the electric vehicle.

The drive apparatus may include a first control chip, a second control chip, a first drive circuit, a second drive circuit, a watchdog chip, and a reset shutdown circuit.

The first drive circuit may be configured to generate a drive signal of the first inverter based on signals output by the first control chip and the reset shutdown circuit; the second drive circuit may be configured to generate a drive signal of the second inverter based on signals output by the second control chip and the reset shutdown circuit; the first control chip may be configured to: send a first watchdog feeding signal to the second control chip, receive a second watchdog feeding signal sent by the second control chip, perform fault monitoring on the second control chip based on the second watchdog feeding signal, and when the second control chip is faulty, control the reset shutdown circuit to send a first shutdown signal to the second drive circuit and to send a first reset signal to the second control chip, where the first shutdown signal is used to shut down drive torque output by the second motor, and the first reset signal is used to reset the second control chip; the second control chip may be configured to: receive the first watchdog feeding signal, send the second watchdog feeding signal to the first control chip, perform fault monitoring on the first control chip based on the first watchdog feeding signal, and when the first control chip is faulty, control the reset shutdown circuit to send a second shutdown signal to the first drive circuit and to send a second reset signal to the first control chip; and the watchdog chip may be configured to supply power to the first control chip, the second control chip, and the reset shutdown circuit. The second shutdown signal may be used to shut down drive torque output by the first motor, and the second reset signal may be used to reset the first control chip.

According to the foregoing drive apparatus, the first control chip and the second control chip may send the watchdog feeding signals to each other, to implement the fault monitoring functions between the first control chip and the second control chip. When a control chip is faulty, the faulty control chip may be reset by using the reset shutdown circuit, and a shutdown chip is sent to a drive circuit connected to the faulty control chip, to shut down a motor controlled by the faulty control chip and stop outputting drive torque, thereby ensuring safety of the electric vehicle. It can be understood that the fault monitoring functions of the two control chips can be implemented without a need to separately configure a watchdog chip for each control chip, thereby meeting a safety requirement of the electric vehicle.

In a possible implementation, the first control chip is further configured to output a third watchdog feeding signal to the watchdog chip when determining that the second control chip is faulty. The watchdog chip is further configured to: receive the third watchdog feeding signal, perform fault monitoring on the first control chip based on the third watchdog feeding signal, and when determining that the first control chip is faulty, control the reset shutdown circuit to send the second reset signal to the first control chip and to send the second shutdown signal to the first drive circuit.

According to the foregoing drive apparatus, when the second control chip is faulty, the second control chip cannot perform fault monitoring on the first control chip, and the watchdog chip may be used to take over the fault monitoring function of the first control chip.

In a possible implementation, the second control chip is further configured to output a fourth watchdog feeding signal to the watchdog chip when determining that the first control chip is faulty. The watchdog chip is further configured to: receive the fourth watchdog feeding signal, perform fault monitoring on the second control chip based on the fourth watchdog feeding signal, and when determining that the second control chip is faulty, control the reset shutdown circuit to send the first reset signal to the second control chip and to send the first shutdown signal to the second drive circuit.

According to the foregoing drive apparatus, when the first control chip is faulty, the first control chip cannot perform fault monitoring on the second control chip, and the watchdog chip may be used to take over the fault monitoring function of the second control chip.

In a possible implementation, the first control chip is further configured to send a first safety exception signal to the reset shutdown circuit, and the first safety exception signal represents that a hardware circuit of the first control chip works abnormally. The second control chip is further configured to send a second safety exception signal to the reset shutdown circuit, and the second safety exception signal represents that a hardware circuit of the second control chip works abnormally.

The reset shutdown circuit is further configured to: send the second shutdown signal to the first drive circuit when receiving the first safety exception signal and send the first shutdown signal to the second drive circuit when receiving the second safety exception signal.

According to the foregoing drive apparatus, when a hardware safety circuit in the first control chip or the second control chip works abnormally, drive torque output by a motor connected to a control chip that works abnormally may be shut down by using the reset shutdown circuit, thereby ensuring running safety of the electric vehicle.

In a possible implementation, the drive apparatus further includes a first sampling circuit and a second sampling circuit.

The first sampling circuit is configured to sample a running parameter of the first motor and output the running parameter to the first control chip, and the second sampling circuit is configured to sample a running parameter of the second motor and output the running parameter to the second control chip. The watchdog chip is further configured to supply power to the first sampling circuit and the second sampling circuit.

According to the foregoing drive apparatus, the first sampling circuit may be used to sample the running parameter of the first motor and may output the running parameter to the first control chip configured to control running of the first motor. The second sampling circuit may be used to sample the running parameter of the second motor and may output the running parameter to the second control chip configured to control running of the second motor.

In a possible implementation, the reset shutdown circuit includes: a first OR gate circuit, a second OR gate circuit, a third OR gate circuit, and a fourth OR gate circuit.

A first input terminal of the first OR gate circuit is connected to the first control chip, a second input terminal of the first OR gate circuit is connected to the second control chip, and an output terminal of the first OR gate circuit is connected to the first drive circuit; a first input terminal of the second OR gate circuit is connected to the second control chip, a second input terminal of the second OR gate circuit is connected to the first control chip, and an output terminal of the second OR gate circuit is connected to the second drive circuit; a first input terminal of the third OR gate circuit is connected to the second control chip, and an output terminal of the third OR gate circuit is connected to a reset terminal of the first control chip; and a first input terminal of the fourth OR gate circuit is connected to the first control chip, and an output terminal of the fourth OR gate circuit is connected to a reset terminal of the second control chip.

In a possible implementation, both a third input terminal of the first OR gate circuit and a third input terminal of the second OR gate circuit are connected to the watchdog chip; and both a second input terminal of the third OR gate circuit and a second input terminal of the fourth OR gate circuit are connected to the watchdog chip.

In a possible implementation, the reset shutdown circuit includes: a first AND gate circuit, a second AND gate circuit, a third AND gate circuit, a fourth AND gate circuit, a fifth AND gate circuit, a sixth AND gate circuit, a seventh AND gate circuit, an eighth AND gate circuit, a first inverter, and a second inverter.

A first input terminal of the first AND gate circuit is connected to the first control chip, a second input terminal of the first AND gate circuit is connected to the first control chip, and an output terminal of the first AND gate circuit is connected to an input terminal of the first inverter; a first input terminal of the second AND gate circuit is connected to the watchdog chip, a second input terminal of the second AND gate circuit is connected to an output terminal of the second inverter, and an output terminal of the second AND gate circuit is connected to a reset terminal of the first control chip; a first input terminal of the third AND gate circuit is connected to the first control chip, a second input terminal of the third AND gate circuit is connected to the output terminal of the second inverter, and an output terminal of the third AND gate circuit is connected to a first input terminal of the fourth AND gate circuit; a second input terminal of the fourth AND gate circuit is connected to the watchdog chip, and an output terminal of the fourth AND gate circuit is connected to the first drive circuit; a first input terminal of the fifth AND gate circuit is connected to the second control chip, a second input terminal of the fifth AND gate circuit is connected to the second control chip, and an output terminal of the fifth AND gate circuit is connected to an input terminal of the second inverter; a first input terminal of the sixth AND gate circuit is connected to the watchdog chip, a second input terminal of the sixth AND gate circuit is connected to an output terminal of the first inverter, and an output terminal of the sixth AND gate circuit is connected to a reset terminal of the second control chip; a first input terminal of the seventh AND gate circuit is connected to the second control chip, a second input terminal of the seventh AND gate circuit is connected to the output terminal of the first inverter, and an output terminal of the seventh AND gate circuit is connected to a first input terminal of the eighth AND gate circuit; and a second input terminal of the eighth AND gate circuit is connected to the watchdog chip, and an output terminal of the eighth AND gate circuit is connected to the second drive circuit.

According to a second aspect, the embodiments may provide an electric vehicle. The electric vehicle includes wheels, a first motor, a second motor, a first inverter configured to supply power to the first motor, a second inverter configured to supply power to the second motor, and the drive apparatus provided in the first aspect.

According to a third aspect, the embodiments may provide a drive apparatus, used in an electric vehicle. The electric vehicle includes a first motor, a second motor, a first inverter configured to supply power to the first motor, a second inverter configured to supply power to the second motor, and the drive apparatus. The drive apparatus may adjust, by providing a drive signal to an inverter that supplies power to a motor, a drive torque value output by the motor, and control running of the electric vehicle.

The drive apparatus may include a first control chip, a second control chip, a first drive circuit, a second drive circuit, a watchdog chip, and a reset shutdown circuit.

The first drive circuit is configured to generate a drive signal of the first inverter based on signals output by the first control chip and the watchdog chip; the second drive circuit is configured to generate a drive signal of the second inverter based on signals output by the second control chip and the reset shutdown circuit; the first control chip is configured to: output a first watchdog feeding signal to the watchdog chip, receive a second watchdog feeding signal output by the second control chip, perform fault monitoring on the second control chip based on the second watchdog feeding signal, and when determining that the second control chip is faulty, control the reset shutdown circuit to send a first shutdown signal to the second drive circuit and to send a first reset signal to the second control chip, where the first shutdown signal is used to shut down drive torque output by the second motor, and the first reset signal is used to reset the second control chip; the second control chip is configured to send the second watchdog feeding signal to the first control chip; and the watchdog chip is configured to supply power to the first control chip, the second control chip, and the reset shutdown circuit, perform fault monitoring on the first control chip based on the first watchdog feeding signal sent by the first control chip, and when the first control chip is faulty, send a second shutdown signal to the first drive circuit and send a second reset signal to the first control chip, where the second shutdown signal is used to shut down drive torque output by the first motor, and the second reset signal is used to reset the first control chip.

According to the foregoing drive apparatus, the watchdog chip may be used to perform fault monitoring on the first control chip, and the first control chip may be used to perform fault monitoring on the second control chip. In this way, when no watchdog chip is configured for the second control chip, the fault monitoring function of the second control chip can be implemented, to ensure safety of the electric vehicle.

In a possible implementation, the watchdog chip is further configured to: when the first control chip is faulty, control the reset shutdown circuit to send a third shutdown signal to the second drive circuit and to send a third reset signal to the second control chip. The third shutdown signal is used to shut down drive torque output by the second motor, and the third reset signal is used to reset the second control chip.

According to the foregoing drive apparatus, when the watchdog chip detects that the first control chip is faulty, because the first control chip cannot perform fault monitoring on the second control chip, to prevent the electric vehicle from running abnormally due to the fault of the second control chip, when the first control chip is faulty, the watchdog chip may control the second control chip to reset and shut down the drive torque output by the second motor, to ensure safety of the electric vehicle.

In a possible implementation, the first control chip is further configured to send a first safety exception signal to the watchdog chip, and the first safety exception signal represents that a hardware circuit of the first control chip works abnormally. The watchdog chip is further configured to send the second shutdown signal to the first drive circuit when receiving the first safety exception signal.

According to the foregoing drive apparatus, when a hardware safety circuit in the first control chip works abnormally, the watchdog chip sends the second shutdown signal to the first drive circuit connected to the first control chip, to shut down the drive torque output by the first motor, thereby ensuring safety of the electric vehicle.

In a possible implementation, the second control chip is further configured to send a second safety exception signal to the reset shutdown circuit, and the second safety exception signal represents that a hardware circuit of the second control chip works abnormally. The reset shutdown circuit is further configured to send the first shutdown signal to the second drive circuit when receiving the second safety exception signal.

According to the foregoing drive apparatus, when a hardware safety circuit in the second control chip works abnormally, the reset shutdown circuit may send the first shutdown signal to the second drive circuit connected to the second control chip, to shut down the drive torque output by the second motor, thereby ensuring safety of the electric vehicle.

In a possible implementation, the drive apparatus further includes a first sampling circuit and a second sampling circuit.

The first sampling circuit is configured to sample a running parameter of the first motor and output the running parameter to the first control chip; the second sampling circuit is configured to sample a running parameter of the second motor and output the running parameter to the second control chip; and the watchdog chip is further configured to supply power to the first sampling circuit and the second sampling circuit.

According to the foregoing drive apparatus, the first sampling circuit may be used to sample the running parameter of the first motor and may output the running parameter to the first control chip configured to control the first motor. The second sampling circuit may be used to sample the running parameter of the second motor and may output the running parameter to the second control chip configured to control the second motor.

In a possible implementation, the reset shutdown circuit includes a first OR gate circuit and a second OR gate circuit.

A first input terminal of the first OR gate circuit is connected to the second control chip, a second input terminal of the first OR gate circuit is connected to the first control chip, and an output terminal of the first OR gate circuit is connected to the second drive circuit; and a first input terminal of the second OR gate circuit is connected to the first control chip, and an output terminal of the second OR gate circuit is connected to a reset terminal of the first control chip.

In a possible implementation, both a third input terminal of the first OR gate circuit and a second input terminal of the second OR gate circuit are connected to the watchdog chip.

In a possible implementation, the reset shutdown circuit includes a first AND gate circuit and a second AND gate circuit.

A first input terminal of the first AND gate circuit is connected to the second control chip, a second input terminal of the first AND gate circuit is connected to the first control chip, and an output terminal of the first AND gate circuit is connected to the second drive circuit; and a first input terminal of the second AND gate circuit is connected to the first control chip, and an output terminal of the second AND gate circuit is connected to a reset terminal of the first control chip.

In a possible implementation, both a third input terminal of the first AND gate circuit and a second input terminal of the second AND gate circuit are connected to the watchdog chip.

According to a fourth aspect, the embodiments may provide an electric vehicle. The electric vehicle includes wheels, a first motor, a second motor, a first inverter configured to supply power to the first motor, a second inverter configured to supply power to the second motor, and the drive apparatus provided in the third aspect.

According to a fifth aspect, an embodiment may provide a drive apparatus, used in an electric vehicle. The electric vehicle includes a first motor, a second motor, a first inverter configured to supply power to the first motor, a second inverter configured to supply power to the second motor, and the drive apparatus. The drive apparatus may adjust, by providing a drive signal to an inverter that supplies power to a motor, a drive torque value output by the motor, and control running of the electric vehicle.

The drive apparatus may include a first control chip, a second control chip, a first drive circuit, a second drive circuit, a watchdog chip, and a reset circuit.

The first drive circuit is configured to generate a drive signal of the first inverter based on signals output by the first control chip and the watchdog chip; the second drive circuit is configured to generate a drive signal of the second inverter based on signals output by the second control chip and the watchdog chip; the first control chip is configured to: send a first watchdog feeding signal to the watchdog chip, receive a second watchdog feeding signal sent by the second control chip, perform fault monitoring on the second control chip based on the second watchdog feeding signal, and when the second control chip is faulty, control, by using the reset circuit, the watchdog chip to send a first shutdown signal to the first drive circuit and to send a second shutdown signal to the second drive circuit, and control the reset circuit to send a first reset signal to the first control chip and to send a second reset signal to the second control chip, where the first shutdown signal is used to shut down drive torque output by the first motor, the second shutdown signal is used to shut down drive torque output by the second motor, the first reset signal is used to reset the first control chip, and the second reset signal is used to reset the second control chip; the second control chip is configured to send the second watchdog feeding signal to the first control chip; and the watchdog chip is configured to: supply power to the first control chip, the second control chip, and the reset circuit, perform fault monitoring on the first control chip based on the first watchdog feeding signal sent by the first control chip, and when determining that the first control chip is faulty, send the first shutdown signal to the first drive circuit and send the second shutdown signal to the second drive circuit, and control the reset circuit to send the first reset signal to the first control chip and to send the second reset signal to the second control chip.

According to the foregoing drive apparatus, the watchdog chip may be used to perform fault monitoring on the first control chip, and the first control chip may be used to perform fault monitoring on the second control chip. In this way, when no watchdog chip is configured for the second control chip, the fault monitoring function of the second control chip can be implemented, to ensure safety of the electric vehicle.

In a possible implementation, the first control chip is further configured to send a first safety exception signal to the reset circuit, and the first safety exception signal represents that a hardware circuit of the first control chip works abnormally. The second control chip is further configured to send a second safety exception signal to the reset circuit, and the second safety exception signal represents that a hardware circuit of the second control chip works abnormally. The reset circuit is further configured to: when the first safety exception signal or the second safety exception signal is received, control the watchdog chip to send the first shutdown signal to the first drive circuit and to send the second shutdown signal to the second drive circuit.

According to the foregoing drive apparatus, when a hardware safety circuit of the first control chip or the second control chip works abnormally, the reset circuit may control the watchdog chip to send a corresponding shutdown signal to a corresponding drive circuit, thereby ensuring safety of the electric vehicle.

In a possible implementation, the drive apparatus further includes a first sampling circuit and a second sampling circuit.

The first sampling circuit is configured to sample a running parameter of the first motor and output the running parameter to the first control chip; the second sampling circuit is configured to sample a running parameter of the second motor and output the running parameter to the second control chip; and the watchdog chip is further configured to supply power to the first sampling circuit and the second sampling circuit.

According to the foregoing drive apparatus, the first sampling circuit may be used to sample the running parameter of the first motor and may output the running parameter to the first control chip configured to control the first motor. The second sampling circuit may be used to sample the running parameter of the second motor and may output the running parameter to the second control chip configured to control the second motor.

In a possible implementation, the reset circuit includes a first OR gate circuit and a second OR gate circuit.

A first input terminal of the first OR gate circuit is connected to the first control chip, a second input terminal of the first OR gate circuit is connected to the second control chip, a third input terminal of the first OR gate circuit is connected to the first control chip, and an output terminal of the first OR gate circuit is connected to the watchdog chip; and a first input terminal of the second OR gate circuit is connected to the watchdog chip, a second input terminal of the second OR gate circuit is connected to the first control chip, and an output terminal of the second OR gate circuit is separately connected to a reset terminal of the first control chip and a reset terminal of the second control chip.

In a possible implementation, the reset circuit includes a first AND gate circuit and a second AND gate circuit.

A first input terminal of the first AND gate circuit is connected to the first control chip, a second input terminal of the first AND gate circuit is connected to the second control chip, a third input terminal of the first AND gate circuit is connected to the first control chip, and an output terminal of the first AND gate circuit is connected to the watchdog chip; and a first input terminal of the second AND gate circuit is connected to the watchdog chip, a second input terminal of the second AND gate circuit is connected to the first control chip, and an output terminal of the second AND gate circuit is separately connected to a reset terminal of the first control chip and a reset terminal of the second control chip.

According to a sixth aspect, the embodiments may provide an electric vehicle. The electric vehicle includes wheels, a first motor, a second motor, a first inverter configured to supply power to the first motor, a second inverter configured to supply power to the second motor, and the drive apparatus provided in the fifth aspect.

DETAILED DESCRIPTION OF THE EMBODIMENTS

Figure 1:
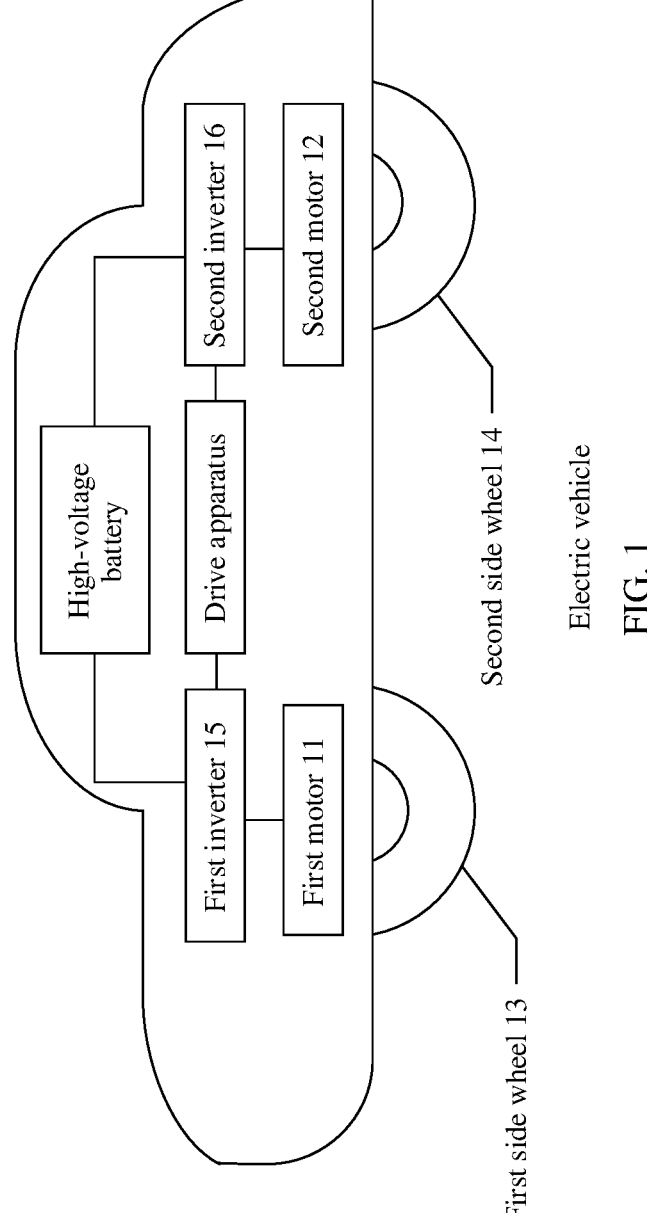
FIG. 1 is a schematic diagram 1 of a structure of an electric vehicle according to an embodiment.

To make the objectives, solutions, and advantages clearer, the following further describes the embodiments in detail with reference to the accompanying drawings.

An operation method in a method embodiment may also be applied to an apparatus embodiment or a system embodiment. It should be noted that in the embodiments, "at least one" means one or more, and "a plurality of" means two or more. In view of this, in embodiments, "a plurality of" may also be understood as "at least two". The term "and/or" describes an association relationship for describing associated objects and represents that three relationships may exist. For example, A and/or B may represent the following three cases: only A exists, both A and B exist, and only B exists. In addition, the character "/" generally indicates an "or" relationship between the associated objects. In addition, it should be understood that in description, terms such as "first" and "second" are merely used for distinguishing and description but should not be understood as indicating or implying relative importance or should not be understood as indicating or implying a sequence.

It should be noted that the "connection" in the embodiments may be understood as an electric connection, and the connection between two electrical elements may be a direct or indirect connection between the two electrical elements. For example, a connection between A and B may represent that A and B are directly connected to each other, or A and B are indirectly connected to each other based on one or more other electrical elements. For example, the connection between A and B may also represent that A is directly connected to C, C is directly connected to B, and A and B are connected to each other through C.

It should be noted that a switch transistor in the embodiments may be one or more types of a plurality of types of switch transistors such as a relay, a metal-oxide-semiconductor field-effect transistor (MOSFET), a bipolar junction transistor (BJT), an insulated gate bipolar transistor (IGBT), and a silicon carbide (SiC) transistor. Details are not enumerated in the embodiments. A packaging form of each switch transistor may be single-tube packaging or may be multi-tube packaging. This is not limited in the embodiments. Each switch transistor may include a first electrode, a second electrode, and a control electrode. The control electrode is configured to control on or off of the switch transistor. When the switch transistor is turned on, a current may be transmitted between the first electrode and the second electrode of the switch transistor. When the switch transistor is turned off, the current cannot be transmitted between the first electrode and the second electrode of the switch transistor. An MOSFET is used as an example. The control electrode of the switch transistor is a gate, the first electrode of the switch transistor may be a source, and the second electrode may be a drain; or the first electrode may be a drain, and the second electrode may be a source.

To facilitate understanding of a drive apparatus provided in the embodiments, the following first describes an application scenario of the drive apparatus.

The drive apparatus may be used in a device that uses a motor to brake. The device includes, but is not limited to, an electric vehicle, an electric ship, an electric unmanned aerial vehicle, an electric train, an electric lorry, an electric truck, a robot, an industrial device, smart logistics, a smart factory, and the like.

In an application scenario, the drive apparatus may be used in the electric vehicle. The vehicle is also referred to as a new energy vehicle, and is a vehicle driven by electric energy. An electric vehicle 10 may include a first motor 11, a second motor 12, a first side wheel 13, a second side wheel 14, a first inverter 15, a second inverter 16, and a first drive apparatus 17. One side of the first side and the second side may be a front side, and the other side may be a rear side.

The electric vehicle 10 may further include a high-voltage battery, a low-voltage battery, and a direct current converter connected between the high-voltage battery and the low-voltage battery. The direct current converter may convert a voltage output by the high-voltage battery, and supply power to the low-voltage battery based on a converted voltage.

As shown in FIG. 1, the electric vehicle 10 may be a four-drive electric vehicle, and both the first motor 11 and the second motor 12 are motors. The first motor 11 is connected to the first side wheel 13, and the second motor 12 is connected to the second side wheel 14. The first motor 11 may drive the first side wheel 13 to rotate, and the second motor 12 may drive the second side wheel 14 to rotate.

When the electric vehicle travels, the first inverter 15 may convert a direct current output by the high-voltage battery into an alternating current. The first motor 11 may obtain electric energy from the first inverter 15, convert the obtained electric energy into mechanical energy, and output drive torque used to drive the first side wheel 13 to rotate, thereby driving the first side wheel 13 to rotate. The second inverter 16 may convert a direct current output by the high-voltage battery into an alternating current. The second motor 12 may obtain electric energy from the second inverter 16, convert the obtained electric energy into mechanical energy, and output drive torque used to drive the second side wheel 14 to rotate, thereby driving the second side wheel 14 to rotate. When the first side wheel 13 and the second side wheel 14 rotate, the electric vehicle 10 is driven to move.

Figure 2:
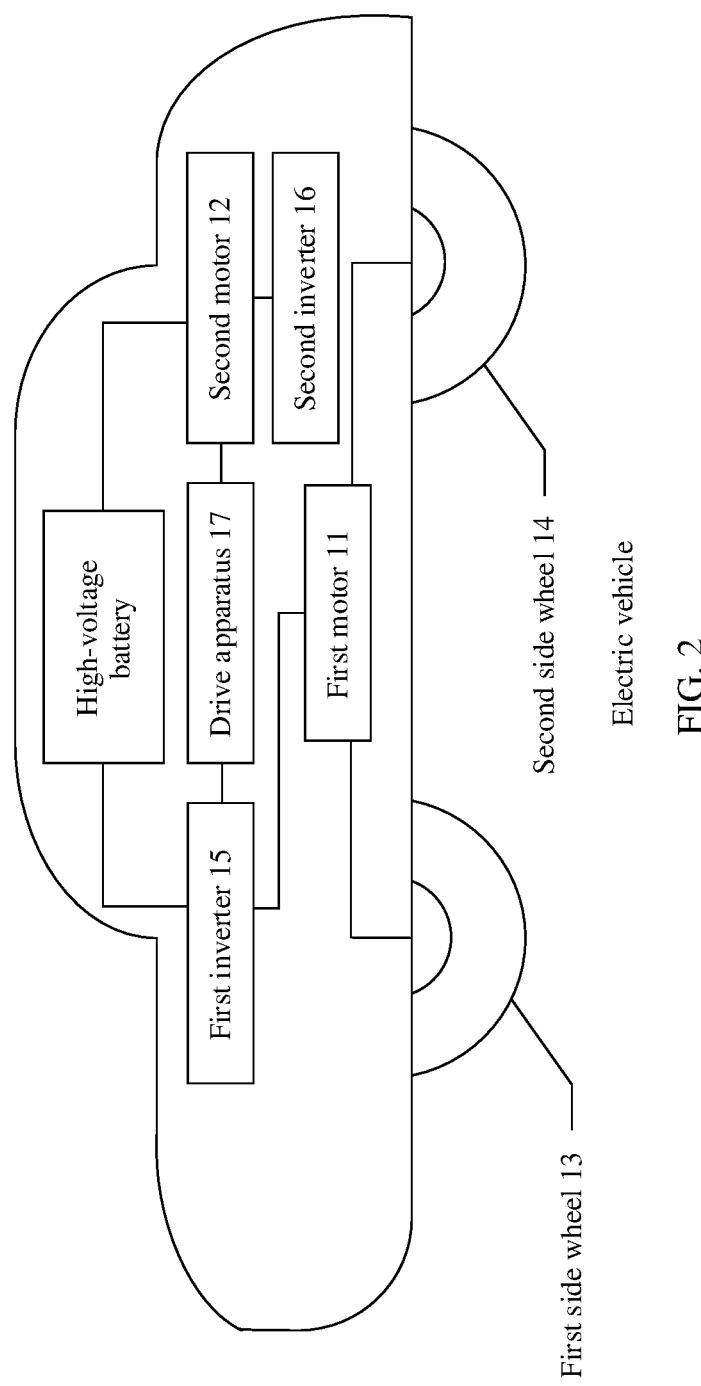
FIG. 2 is a schematic diagram 2 of a structure of an electric vehicle according to an embodiment.

As shown in FIG. 2, the electric vehicle 10 may be a hybrid electric vehicle, the first motor 11 may be a motor, and the second motor 12 may be a generator. The first motor 11 is connected to the first side wheel 13 and the second side wheel 14, and the first motor 11 may drive the first side wheel 13 and the second side wheel 14 to rotate. The second motor 12 may convert mechanical energy into electric energy and may charge the high-voltage battery in the electric vehicle 10.

When the electric vehicle travels, both the first inverter 15 and the second inverter 16 each are formed by a plurality of switches. The first inverter 15 may convert a direct current output by the high-voltage battery into an alternating current. The first motor 11 may obtain electric energy from the first inverter 15, convert the obtained electric energy into mechanical energy, and output drive torque used to drive the first side wheel 13 and the second side wheel 14 to rotate, thereby driving the first side wheel 13 and the second side wheel 14 to rotate. When the first side wheel 13 and the second side wheel 14 rotate, the electric vehicle 10 is driven to move. The second inverter 16 may convert a direct current output by the high-voltage battery into an alternating current. The second motor 12 may obtain electric energy from the second inverter 16, convert mechanical energy into electric energy, and output the electric energy to the high-voltage battery of the electric vehicle, thereby charging the high-voltage battery.

The drive apparatus 17 is separately connected to the first inverter 15 and the second inverter 16 and provides drive signals for switches in the first inverter 15 and the second inverter 16. The first inverter 15 and the second inverter 16 can convert the direct current output by the high-voltage battery into the alternating current only after receiving the drive signals. The low-voltage battery is connected to the drive apparatus 17 and supplies power to the drive apparatus 17.

Figure 3:
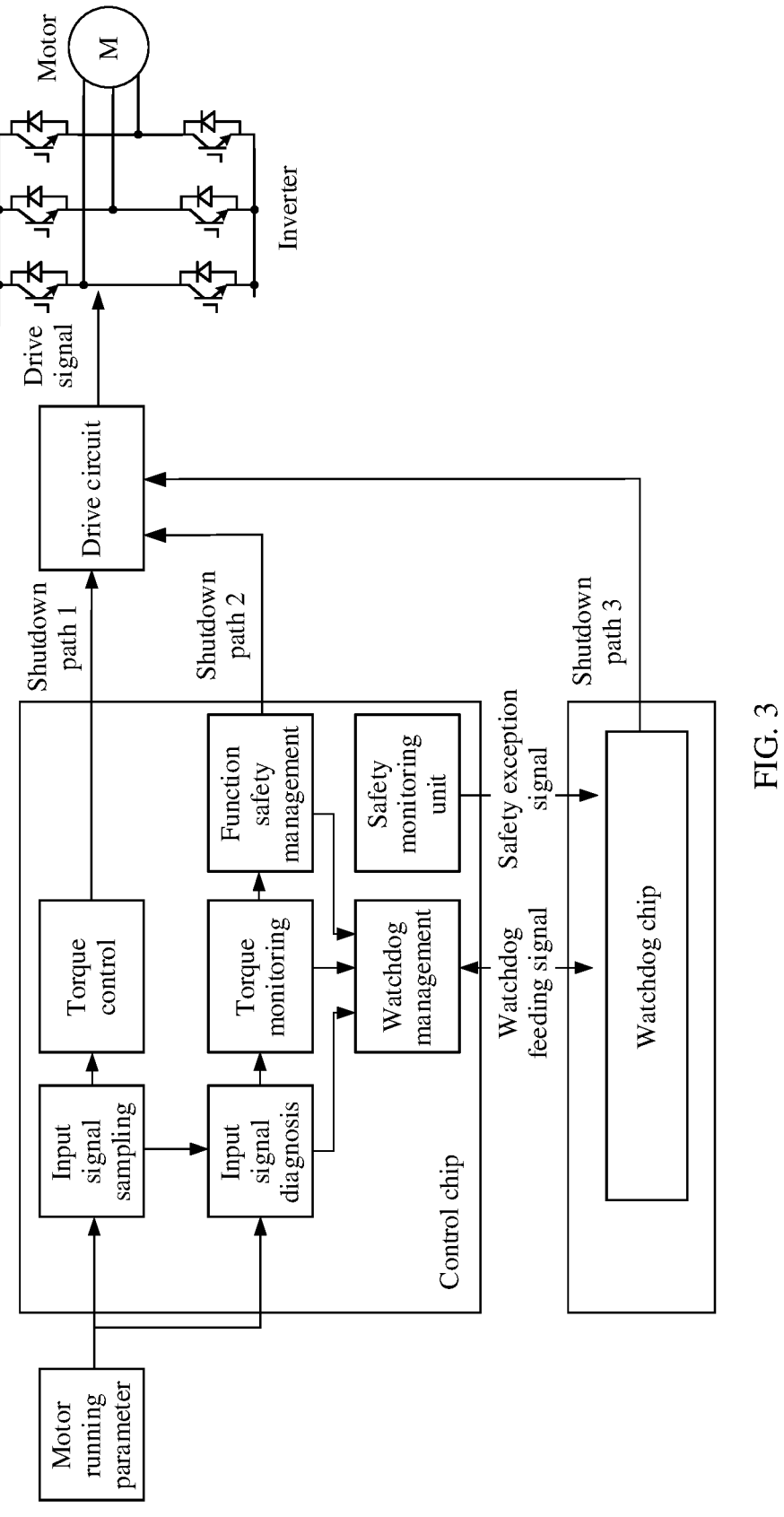
FIG. 3 is a schematic diagram of a driving process of a drive apparatus according to an embodiment.
Figure 4:
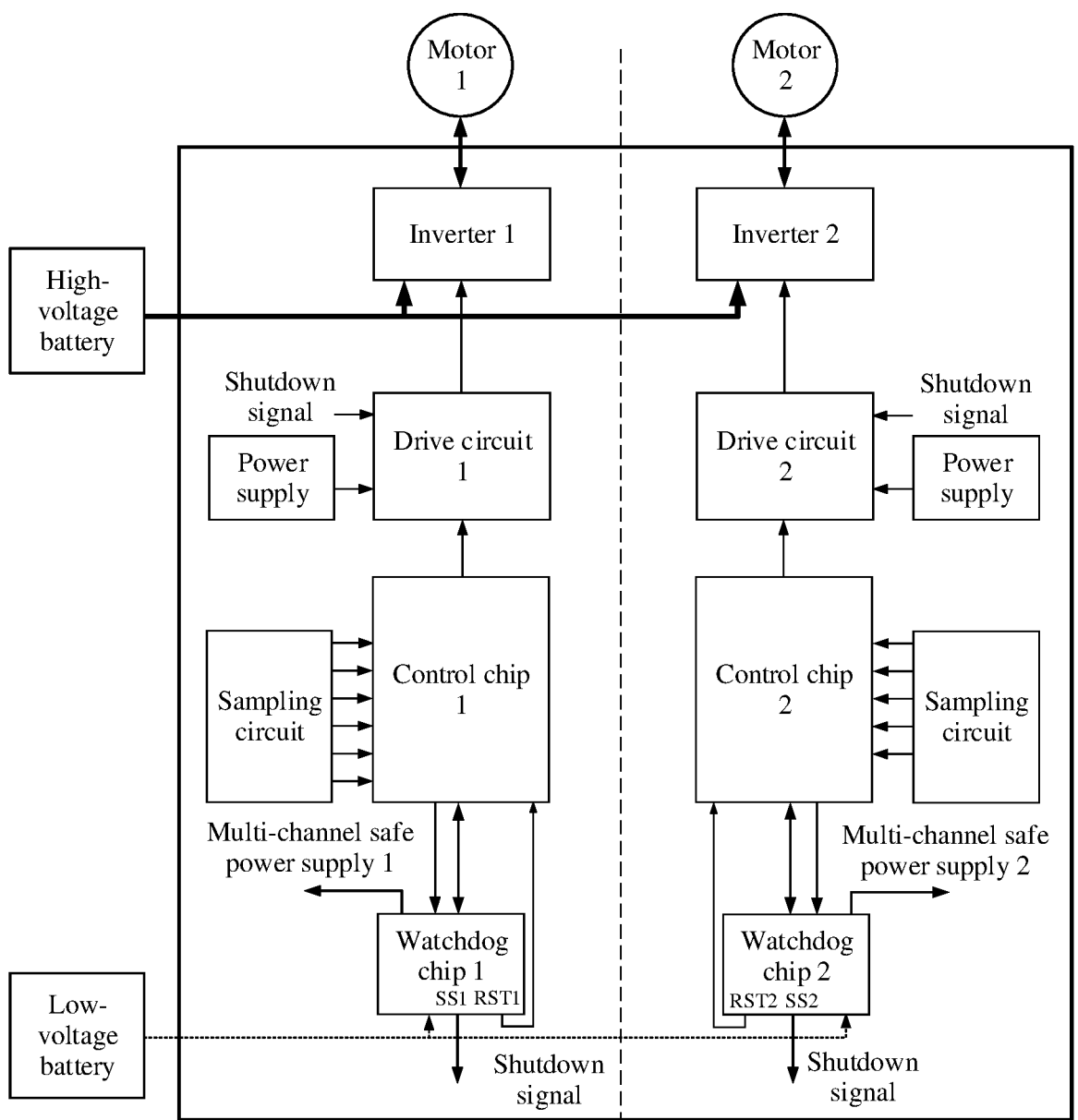
FIG. 4 is a schematic diagram of a structure of a drive apparatus according to an embodiment.

As shown in FIG. 3, the drive apparatus 17 may include a control chip, a watchdog chip, and a drive circuit. A running parameter of the motor is used as an input terminal signal. The control chip samples the input signal, uses the input signal to generate a pulse width modulation (PWM) signal for controlling the drive circuit to output a drive signal, and outputs the PWM signal to the drive circuit. When the motor runs normally, the running parameter of the motor fluctuates within an interval. Therefore, the control chip may further perform diagnosis based on the input signal and may determine whether the generated PWM signal is accurate. When the input signal deviates from the interval or the PWM signal is abnormal, drive torque output by the motor may be shut down based on a corresponding drive signal sent by the drive circuit. The control chip sends a watchdog feeding signal to the watchdog chip. The watchdog chip may perform fault monitoring on the control chip based on the watchdog feeding signal, and when detecting that the control chip is faulty, send a corresponding drive signal by using the drive circuit, to shut down the drive torque output by the motor.

In actual use, the watchdog chip is connected to the low-voltage battery, obtains electric energy from the low-voltage battery, and outputs a plurality of safety signals to supply power to a plurality of components in the drive apparatus, for example, the drive circuit and the control chip.

In actual use, the first motor 11 and the second motor 12 work independently. Two independent drive control devices are disposed in the drive apparatus 17.

In actual use, one watchdog chip needs to be configured in a drive control device of each motor, and the watchdog chip is used to perform fault monitoring on the control chip. A configuration of two watchdog chips may increase costs and a volume of the drive apparatus.

To resolve the foregoing problem, one watchdog chip is considered to meet fault monitoring requirements of two control chips.

The following describes the embodiments with reference to the accompanying drawings. It is clear that the described embodiments are merely some but not all of embodiments.

Embodiment 1

Figure 5:
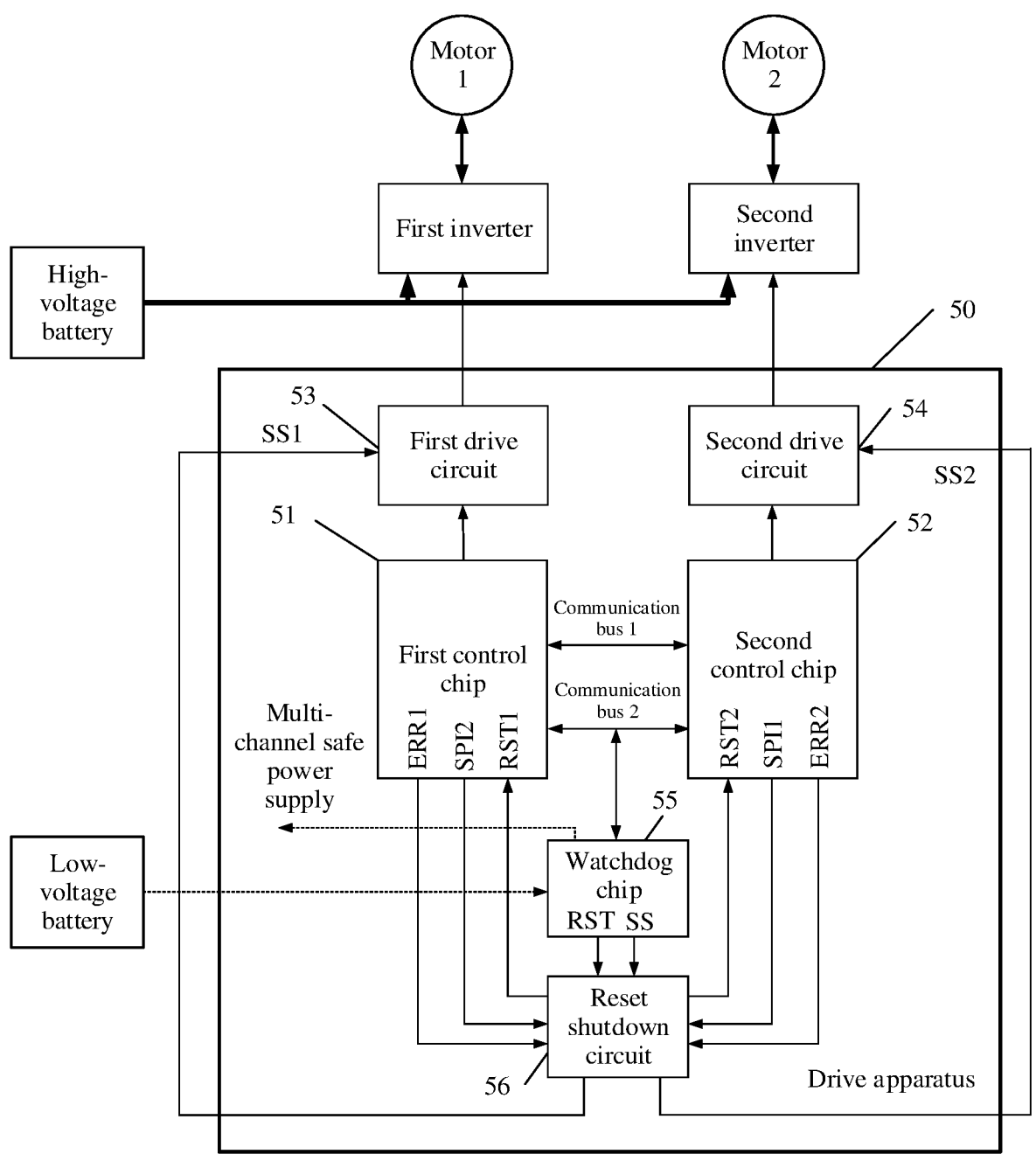
FIG. 5 is a schematic diagram 1 of a structure of a drive apparatus according to an embodiment.

FIG. 5 is an example of a schematic diagram of a structure of a drive apparatus according to Embodiment 1. The drive apparatus may be used in an electric vehicle. The electric vehicle includes a motor 1, a motor 2, a first inverter configured to supply power to the motor 1, a second inverter configured to supply power to the motor 2, and the drive apparatus. As shown in FIG. 5, in Embodiment 1, a drive apparatus 50 includes a first control chip 51, a second control chip 52, a first drive circuit 53, a second drive circuit 54, a watchdog chip 55, and a reset shutdown circuit 56.

The first drive circuit 53 is connected to the first control chip 51 and the reset shutdown circuit 56. The second drive circuit 54 is connected to the second control chip 52 and the reset shutdown circuit 56. The first control chip 51 is connected to the second control chip 52, and is configured to: send a first watchdog feeding signal to the second control chip 52, receive a second watchdog feeding signal sent by the second control chip 52, perform fault monitoring on the second control chip 52 based on the second watchdog feeding signal, and when the second control chip 52 is faulty, control the reset shutdown circuit 56 to send a shutdown signal to the second drive circuit 54 and to send a reset signal to the second control chip 52. The watchdog chip 55 is separately connected to the first control chip 51, the second control chip 52, and the reset shutdown circuit 56, and the reset shutdown circuit 56 is separately connected to the first control chip 51 and the second control chip 52.

The first drive circuit 53 is configured to generate a drive signal of the first inverter based on signals output by the first control chip 51 and the reset shutdown circuit 56 and output the drive signal to the first inverter. The first drive circuit 53 is configured to generate a drive signal of the second inverter based on signals output by the second control chip 52 and the reset shutdown circuit 56 and output the drive signal to the second inverter. The first control chip 51 is configured to: send the first watchdog feeding signal to the second control chip 52, receive the second watchdog feeding signal sent by the second control chip 52, perform fault monitoring on the second control chip 52 based on the second watchdog feeding signal, and when the second control chip 52 is faulty, control the reset shutdown circuit 56 to send a first shutdown signal to the second drive circuit 54 and to send a first reset signal to the second control chip 52. The second control chip 52 is configured to: receive the first watchdog feeding signal, send the second watchdog feeding signal to the first control chip 51, perform fault monitoring on the first control chip 51 based on the first watchdog feeding signal, and when the first control chip 51 is faulty, control the reset shutdown circuit 56 to send a second shutdown signal to the first drive circuit 53 and to send a second reset signal to the first control chip 51. The watchdog chip 55 is configured to supply power to the first control chip 51, the second control chip 52, and the reset shutdown circuit 56.

The first shutdown signal is used to shut down drive torque output by the motor 2, the second shutdown signal is used to shut down drive torque output by the motor 1, the first reset signal is used to reset the second control chip 52, and the second reset signal is used to reset the first control chip 51.

In actual application, the electric vehicle further includes a high-voltage battery and a low-voltage battery. The high-voltage battery separately supplies power to the first inverter and the second inverter, and the low-voltage battery supplies power to the watchdog chip 55. The watchdog chip 55 obtains electric energy from the low-voltage battery, outputs a plurality of safe power supply voltages, and supplies power to a plurality of components in the drive apparatus 50 based on the plurality of safe power supply voltages.

Figure 6:
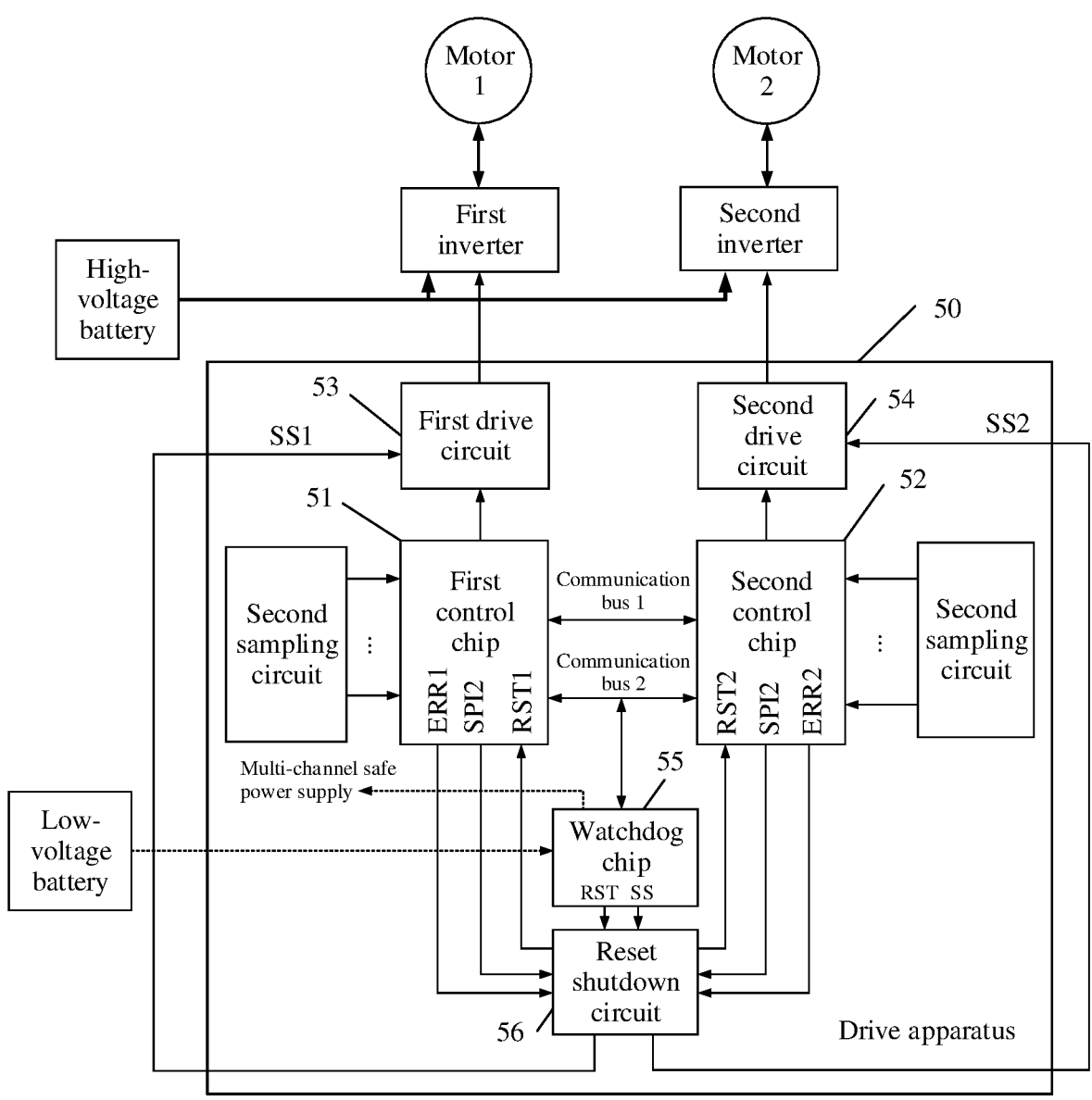
FIG. 6 is a schematic diagram 2 of a structure of a drive apparatus according to an embodiment.

As shown in FIG. 6, the drive apparatus 50 may further include a first sampling circuit and a second sampling circuit. The first sampling circuit is connected to the first control chip 51, and the second sampling circuit is connected to the second control chip 52. The first sampling circuit is configured to sample a running parameter of the motor 1 and output the running parameter to the first control chip 51 configured to control running of the motor 1, and the second sampling circuit is configured to sample a running parameter of the motor 2 and output the running parameter to the second control chip 52 configured to control running of the motor 2. The running parameter is an electrical parameter and/or a physical parameter that represents a current running status of the motor, for example, a current, a voltage, or torque.

In actual use, the watchdog chip 55 may be separately connected to the first sampling circuit and the second sampling circuit, and supply power to the first sampling circuit and the second sampling circuit.

The first control chip 51 may sample the running parameter of the motor 1 by using the first sampling circuit, may calculate a PWM signal of each switch based on the sampled running parameter, and may output the PWM signal to the first drive circuit 53. After receiving the PWM signal, the first drive circuit 53 generates the drive signal of the first inverter, to control the first inverter to supply power to the motor 1, thereby driving the electric vehicle to run. When the motor 1 runs normally, the running parameter of the motor 1 fluctuates within an interval. Therefore, the first control chip 51 may further perform fault diagnosis based on the running parameter and may determine whether the generated PWM signal is accurate. When the running parameter exceeds the interval or the PWM signal is abnormal, the first inverter may be controlled, by adjusting the drive signal output by the first drive circuit 53, to shut down the drive torque output by the motor 1. Similarly, the second control chip 52 samples the running parameter of the motor 2 by using the second sampling circuit, calculates a PWM signal based on the sampled running parameter, and outputs the PWM signal to the second drive circuit 54. After receiving the PWM signal, the second drive circuit 54 generates the drive signal of the second inverter, to control the second inverter to supply power to the motor 2, thereby driving the electric vehicle to run. When the motor runs normally, the running parameter of the motor 2 fluctuates within an interval. Therefore, the second control chip 52 may further perform diagnosis based on the sampled running parameter and may determine whether the generated PWM signal is accurate. When the running parameter exceeds the interval or the PWM signal is abnormal, the second inverter may be controlled, by adjusting the drive signal output by the second drive circuit 54, to shut down the drive torque output by the motor 2.

The first control chip 51 is connected to the second control chip 52, and the first control chip 51 performs a watchdog feeding operation on the second control chip 52 by sending the first watchdog feeding signal. The second control chip 52 performs a watchdog feeding operation on the first control chip 51 by sending the second watchdog feeding signal. The first control chip 51 may perform fault status monitoring on the second control chip 52 based on the second watchdog feeding signal. The second control chip 52 may perform fault status monitoring on the first control chip 51 based on the first watchdog feeding signal. When the first control chip 51 is faulty, the second reset signal may be sent to the first control chip 51 to control the first control chip 51 to be reset to an initial safe state, and the second shutdown signal may be sent to the first drive circuit 53 to shut down the drive torque output by the motor 1, thereby ensuring safety of the electric vehicle. When the second control chip 52 is faulty, the first reset signal may be sent to the second control chip 52 to control the second control chip 52 to be reset to an initial safe state, and the first shutdown signal may be sent to the second drive circuit 54 to shut down the drive torque output by the motor 2, thereby ensuring safety of the electric vehicle. It can be understood that, according to the drive apparatus 50 in Embodiment 1, fault monitoring functions of two control chips can be implemented without a need of configuring a watchdog chip used for fault monitoring for each control chip, and corresponding processing is performed when a control chip is faulty, to ensure safety of the electric vehicle.

When detecting that the second control chip 52 is faulty, the first control chip 51 sends, to the reset shutdown circuit 56, a first signal representing that the second control chip 52 is faulty, SPI2 for short below. After receiving the SPI2, the reset shutdown circuit 56 sends the first reset signal, RST2 for short below, to the second control chip, and sends the first shutdown signal, SS2 for short below, to the second drive circuit 54. Similarly, when detecting that the first control chip 51 is faulty, the second control chip 52 sends, to the reset shutdown circuit 56, a second signal representing that the first control chip 51 is faulty, SPI1 for short below. After receiving the SPI1, the reset shutdown circuit 56 sends the second reset signal, RST1 for short below, to the first control chip 51, and sends the second shutdown signal, SS1 for short below, to the first drive circuit 53.

In the foregoing Embodiment 1, a communication bus 1 is disposed between the first control chip 51 and the second control chip 52, and the communication bus 1 may be separately connected to one or more pins of the first control chip 51 and the second control chip 52. The first control chip 51 may send the first watchdog feeding signal to the second control chip 52 through the communication bus 1, to implement the watchdog feeding operation on the second control chip 52. Similarly, the second control chip 52 may send the second watchdog feeding signal to the first control chip 51 through the communication bus 1, to implement the watchdog feeding operation on the first control chip 51. The communication bus 1 may be connected to any pin in an idle state in the control chip. This is not limited herein.

In an example, the watchdog feeding signal may include a time window watchdog signal and a question and answer watchdog signal.

A fault monitoring process of a time window watchdog is as follows: The first control chip 51 periodically sends a time window watchdog signal to the second control chip 52, and the second control chip 52 detects whether the time window watchdog signal arrives according to a preset period. If the time window watchdog does not arrive according to the preset period, it is determined that the first control chip 51 is faulty. Similarly, the second control chip 52 periodically acknowledges, and the first control chip 51 detects whether the periodic acknowledgment arrives according to a preset period. If the periodic acknowledgment does not arrive according to the preset period, the first control chip 51 determines that the second control chip 52 is faulty.

A fault monitoring process of a question and answer watchdog is as follows: The first control chip 51 generates a series of questions in sequence, and periodically sends the questions to the second control chip 52. After receiving the foregoing questions, the second control chip 52 answers the questions in the question sequence. The first control chip 51 may read answers from the second control chip, and if no reply from the second control chip 52 is received within a preset time, the first control chip 51 determines that the second control chip 52 is faulty.

When the first control chip 51 detected that the second control chip 52 is faulty, the second control chip 52 cannot perform fault monitoring on the first control chip 51. To ensure running safety of the electric vehicle, a communication bus 2 is further disposed between the first control chip 51 and the second control chip 52, to implement fault status notification of the two control chips. The communication bus 2 is further connected to the watchdog chip 55. When any control chip is faulty, the watchdog chip 55 takes over a fault monitoring function of a control chip that is not faulty.

When determining that the second control chip 52 is faulty, the watchdog chip 55 enables a function circuit corresponding to a watchdog function, and the first control chip 51 outputs a third watchdog feeding signal to the watchdog chip 55. The watchdog chip receives the third watchdog feeding signal, performs fault monitoring on the first control chip 51 based on the third watchdog feeding signal, and when determining that the first control chip 51 is faulty, controls the reset shutdown circuit 56 to output the second reset signal to the first control chip 51 and output the second shutdown signal to the first drive circuit 53. Similarly, when determining that the first control chip 51 is faulty, the watchdog chip 55 enables a function circuit corresponding to a watchdog function, and the second control chip 52 outputs a fourth watchdog feeding signal to the watchdog chip. The watchdog chip 55 receives the fourth watchdog feeding signal, performs fault monitoring on the second control chip 52 based on the fourth watchdog feeding signal, and when determining that the second control chip 52 is faulty, controls the reset shutdown circuit 56 to output the first reset signal to the second control chip 52 and output the first shutdown signal to the second drive circuit 54.

It should be understood that a process in which the watchdog chip 55 performs fault monitoring on the control chip that is not faulty based on the watchdog feeding signal is the same as the fault monitoring process of the foregoing two control chips. Details are not described herein again.

In an optional solution, the first control chip 51 is further configured to send a first safety exception signal to the reset shutdown circuit 56, and the first safety exception signal represents that a hardware circuit of the first control chip works abnormally and is referred to as ERR1 for short below. The second control chip 52 is further configured to send a second safety exception signal to the reset shutdown circuit 56, and the second safety exception signal represents that a hardware circuit of the second control chip 52 works abnormally and is referred to as ERR2 for short below. The reset shutdown circuit 56 sends the second shutdown signal to the first drive circuit when receiving the first safety exception signal and sends the first shutdown signal to the second drive circuit when receiving the second safety exception signal.

It can be understood from the foregoing description that, when it is detected that the first control chip 51 or the second control chip 52 is faulty, safety of the electric vehicle may be implemented by outputting a corresponding reset signal and a corresponding shutdown signal by using the reset shutdown circuit 56. The following describes in detail a process of outputting the reset signal and the shutdown signal by the reset shutdown circuit 56.

Figure 7:
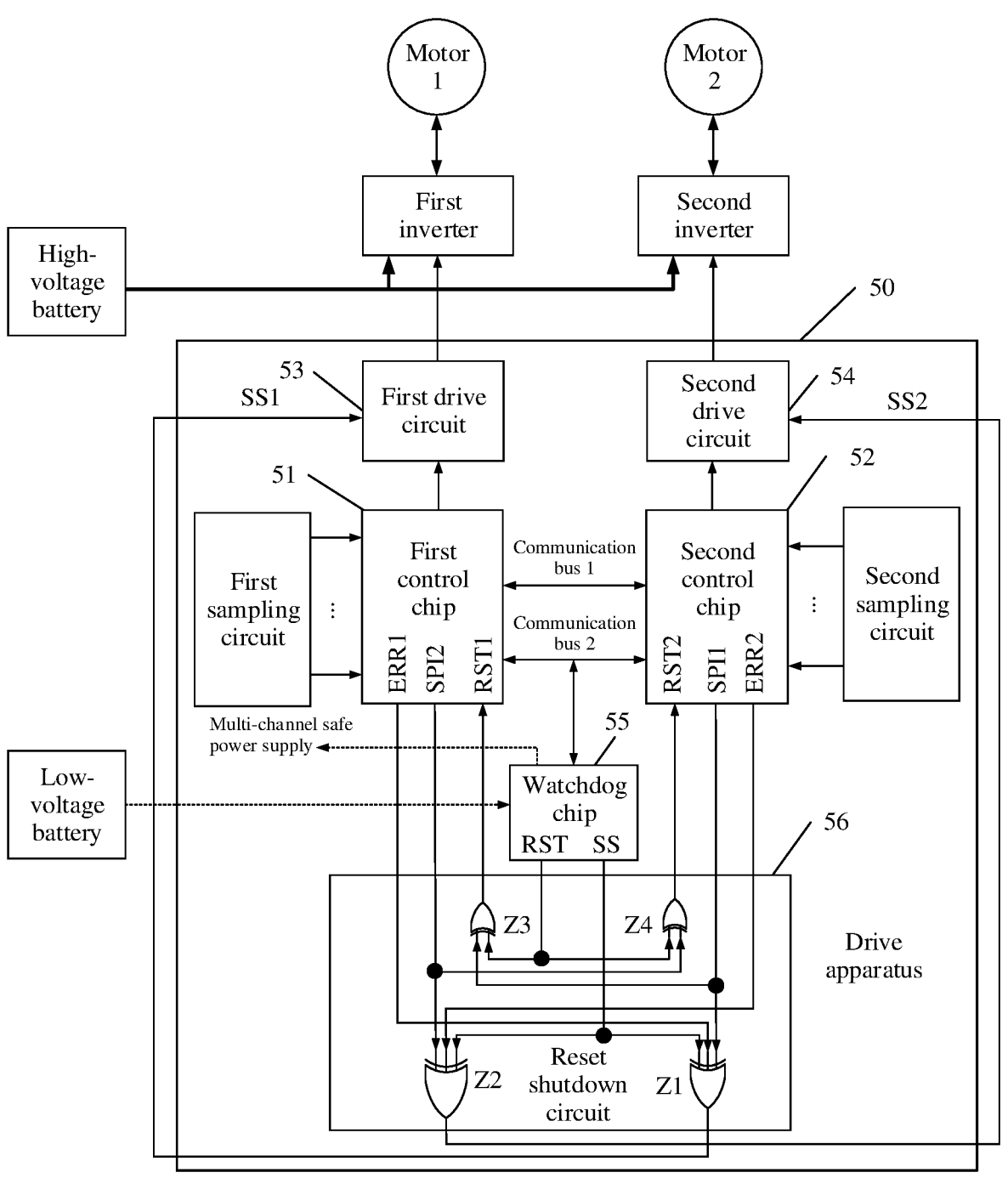
FIG. 7 is a schematic diagram 1 of a structure of a reset shutdown circuit according to Embodiment 1.

As shown in FIG. 7, the reset shutdown circuit 56 may include a first OR gate circuit Z1, a second OR gate circuit Z2, a third OR gate circuit Z3, and a fourth OR gate circuit Z4.

A connection relationship between components in the reset shutdown circuit 56 may be as follows: A first input terminal of the first OR gate circuit Z1 is connected to the first control chip 51, a second input terminal of the first OR gate circuit Z1 is connected to the second control chip 52, and an output terminal of the first OR gate circuit Z1 is connected to the first drive circuit 53; a first input terminal of the second OR gate circuit Z2 is connected to the second control chip 52, a second input terminal of the second OR gate circuit Z2 is connected to the first control chip 51, and an output terminal of the second OR gate circuit Z2 is connected to the second drive circuit 54; a first input terminal of the third OR gate circuit Z3 is connected to the second control chip 52, and an output terminal of the third OR gate circuit Z3 is connected to a reset terminal of the first control chip 51; and a first input terminal of the fourth OR gate circuit Z4 is connected to the first control chip 51, and an output terminal of the fourth OR gate circuit Z4 is connected to a reset terminal of the second control chip 52.

The Z1 generates the second shutdown signal SS1 of the first drive circuit 53, and outputs the SS1 to the first drive circuit 53 through the output terminal. The Z2 generates the first shutdown signal SS2 of the second drive circuit 54, and outputs the SS2 to the second drive circuit through the output terminal. The Z3 generates the second reset signal RST1 of the first control chip, and outputs the RST1 to the first control chip through the output terminal. The Z4 generates the first reset signal RST2 of the second control chip, and outputs the RST2 to the second control chip 52 through the output terminal.

In actual application, the drive circuit may stop providing drive signals for all or some switches (for example, an upper bridge arm switch or a lower bridge arm switch) in an inverter, to shut down drive torque output by a motor connected to the inverter, to control the electric vehicle to be in a safe state. The upper bridge arm switch may be a switch connected to a positive electrode of a high-voltage battery in the inverter, and the lower bridge arm switch may be a switch connected to a negative electrode of a high-voltage battery in the inverter.

For a corresponding relationship between an input terminal signal and an output signal of the reset shutdown circuit 56, see Table 1. When the input signal of the reset shutdown circuit is determined, the output signal of the reset shutdown circuit may be determined with reference to Table 1. 1 may represent a high-level signal, 0 represents a low-level signal, and X is either 0 or 1. An example in which the high-level signal is a valid signal is used for description.

17

TABLE 1

| Correspondence between the input signal and the output signal of the reset shutdown circuit | | | | | | | |
|------|------|------|------|------|------|------|------|
| ERR1 | SPI2 | ERR2 | SPI1 | RST1 | SS1 | RST2 | SS2 |
| 1 | X | 0 | 0 | 0 | 0 | 1 | 0 |
| 0 | 0 | 1 | X | 0 | 0 | 0 | 1 |
| 0 | 1 | 0 | 0 | 0 | 0 | 1 | 1 |
| 0 | 0 | 0 | 1 | 1 | 1 | 0 | 0 |
| 0 | 0 | 0 | 0 | 0 | 0 | 0 | 0 |

When the first control chip 51 detects that the second control chip 52 is faulty, the first control chip 51 outputs the high-level signal to the Z4 and the Z2. In this case, the Z4 sends the RST2 for performing reset to the reset terminal of the second control chip 52. When receiving the RST2, the second control chip 52 performs a reset operation, and the second control chip 52 is restored to an initial safe state. The output terminal of the Z2 sends the SS2 to the second drive circuit 54. When receiving the SS2, the second drive circuit 54 may adjust the drive signal provided for the second inverter, to control the second inverter to shut down the drive torque output by the motor 2, thereby ensuring safety of the electric vehicle. Similarly, when the second control chip 52 detects that the first control chip 51 is faulty, the second control chip 52 outputs the high-level signal to the Z3 and the Z1. In this case, the Z3 sends the RST1 for performing reset to the reset terminal of the first control chip 51. When receiving the RST1, the first control chip 51 performs a reset operation, and the first control chip 51 is restored to an initial safe state. The output terminal of the Z1 sends the SS1 to the first drive circuit 53. When receiving the SS1, the first drive circuit 53 controls and adjusts the drive signal provided for the second inverter, to control the second inverter to shut down the drive torque output by the motor 2, thereby ensuring safety of the electric vehicle.

In actual application, when a hardware safety circuit that is inside the first control chip 51 and that performs safety monitoring works abnormally, the first control chip 51 outputs the high-level signal to the input terminal of the Z1. In this case, the output terminal of the Z1 sends the SS1 to the first drive circuit 53. When receiving the SS1, the first drive circuit 53 adjusts the drive signal provided for the first inverter, to control the first inverter to shut down the drive torque output by the motor 1, thereby ensuring safety of the electric vehicle. Similarly, when a hardware safety circuit that is inside the second control chip 52 and that performs safety monitoring works abnormally, the second control chip 52 outputs the high-level signal to the input terminal of the Z2. In this case, the output terminal of the Z2 sends the SS2 to the second drive circuit 54. When receiving the SS2, the second drive circuit 54 controls and adjusts the drive signal provided for the second inverter, to control the second inverter to shut down the drive torque output by the motor 2, thereby ensuring safety of the electric vehicle.

In actual application, when any one of the first control chip 51 or the second control chip 52 is faulty, the watchdog chip 55 takes over a fault monitoring function of a control chip that is not faulty. When detecting that the control chip is faulty, the watchdog chip 55 may send a reset signal to the faulty control chip by using the reset shutdown circuit 56 and send a shutdown signal to a drive circuit connected to the faulty control chip. After receiving the reset signal, the faulty control chip is reset and enters an initial safe state, and after receiving the shutdown signal, the drive circuit adjusts a drive signal output to an inverter, to shut down drive torque output by a motor connected to the inverter, thereby implementing safety of the electric vehicle.

To implement the fault monitoring function and safety protection of the foregoing watchdog chip, both a third input terminal of the first OR gate circuit Z1 and a third input terminal of the second OR gate circuit Z2 may be connected to the watchdog chip 55. Both a second input terminal of the third OR gate circuit Z3 and a second input terminal of the fourth OR gate circuit Z4 are connected to the watchdog chip 55.

It should be understood that, the foregoing is only an implementation in which the high-level signal is valid. In another implementation, a logic gate circuit in which a low-level signal is valid may be selected in the reset shutdown circuit 56 to implement outputs of the shutdown signal and the reset signal.

In an example, an AND gate circuit may be used to replace the OR gate circuit in FIG. 7, and a connection relationship of the logic gate circuit remains unchanged.

Figure 8:
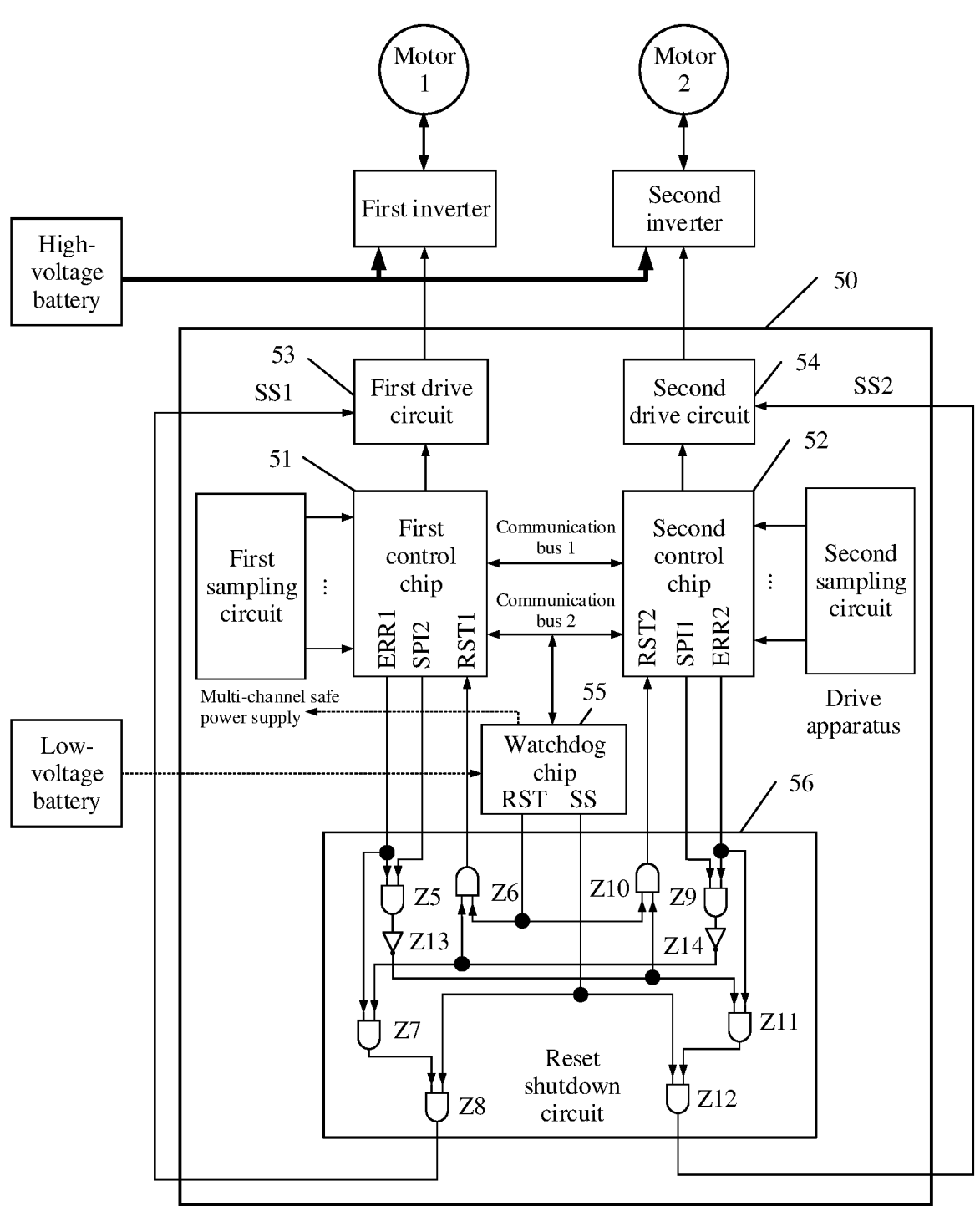
FIG. 8 is a schematic diagram 2 of a structure of a reset shutdown circuit according to Embodiment 1.

As shown in FIG. 8, the reset shutdown circuit may include a first AND gate circuit Z5, a second AND gate circuit Z6, a third AND gate circuit Z7, a fourth AND gate circuit Z8, a fifth AND gate circuit Z9, a sixth AND gate circuit Z10, and a seventh AND gate circuit Z11, an eighth AND gate circuit Z12, a first inverter Z13, and a second inverter Z14.

A connection relationship between components in the reset shutdown circuit is as follows: A first input terminal of the first AND gate circuit Z5 is connected to the first control chip 51, a second input terminal of the first AND gate circuit Z5 is connected to the first control chip 51, and an output terminal of the first AND gate circuit Z5 is connected to an input terminal of the first inverter Z13; a first input terminal of the second AND gate circuit Z6 is connected to the watchdog chip 55, a second input terminal of the second AND gate circuit Z6 is connected to an output terminal of the second inverter Z14, and an output terminal of the second AND gate circuit Z6 is connected to a reset terminal of the first control chip 51; a first input terminal of the third AND gate circuit Z7 is connected to the first control chip 51, a second input terminal of the third AND gate circuit Z7 is connected to an output terminal of the second inverter Z14, and an output terminal of the third AND gate circuit Z7 is connected to a first input terminal of the fourth AND gate circuit Z8; a second input terminal of the fourth AND gate circuit Z8 is connected to the watchdog chip 55, and an output terminal of the fourth AND gate circuit Z8 is connected to the first drive circuit 53; a first input terminal of the fifth AND gate circuit Z9 is connected to the second control chip 52, a second input terminal of the fifth AND gate circuit Z9 is connected to the second control chip 52, and an output terminal of the fifth AND gate circuit Z9 is connected to an input terminal of the second inverter Z14; a first input terminal of the sixth AND gate circuit Z10 is connected to the watchdog chip 55, a second input terminal of the sixth AND gate circuit Z10 is connected to an output terminal of the first inverter Z13, and an output terminal of the sixth AND gate circuit Z10 is connected to a reset terminal of the second control chip 52; a first input terminal of the seventh AND gate circuit Z11 is connected to the second control chip 52, a second input terminal of the seventh AND gate circuit Z11 is connected to the output terminal of the first inverter Z13, and an output terminal of the seventh AND gate circuit Z11 is connected to a first input terminal of the eighth AND gate circuit Z12; and a second input terminal of the eighth AND gate circuit Z12 is connected to the watchdog chip 55, and an output terminal of the eighth AND gate circuit Z12 is connected to the second drive circuit 54.

The second AND gate circuit Z2 outputs the second reset signal RST1 of the first control chip 51, the sixth AND gate circuit Z10 outputs the first reset signal RST2 of the second control chip 52, the fourth AND gate circuit Z8 outputs the second shutdown signal SS1 of the first drive circuit 53, and the eighth AND gate circuit Z12 outputs the first shutdown signal SS2 of the second drive circuit 54.

In actual use, a first NAND gate may be used to replace the first AND gate circuit Z5 and the first inverter Z13 in FIG. 8, and a second NAND gate may be used to replace the fifth AND gate circuit Z9 and the second inverter Z14 in FIG. 8.

It should be noted that the foregoing description of the reset shutdown circuit is merely an example. In actual use, the drive circuit may stop providing drive signals for all or some switches in the inverter, to shut down the drive torque output by the motor. According to the shutdown manner of the drive torque of the motor, the reset shutdown circuit may further use another logic circuit.

According to the solution provided in Embodiment 1, an electric vehicle may include wheels, a first motor, a second motor, a first inverter configured to supply power to the first motor, a second inverter configured to supply power to the second motor, and the drive apparatus 50.

Embodiment 2

Figure 9:
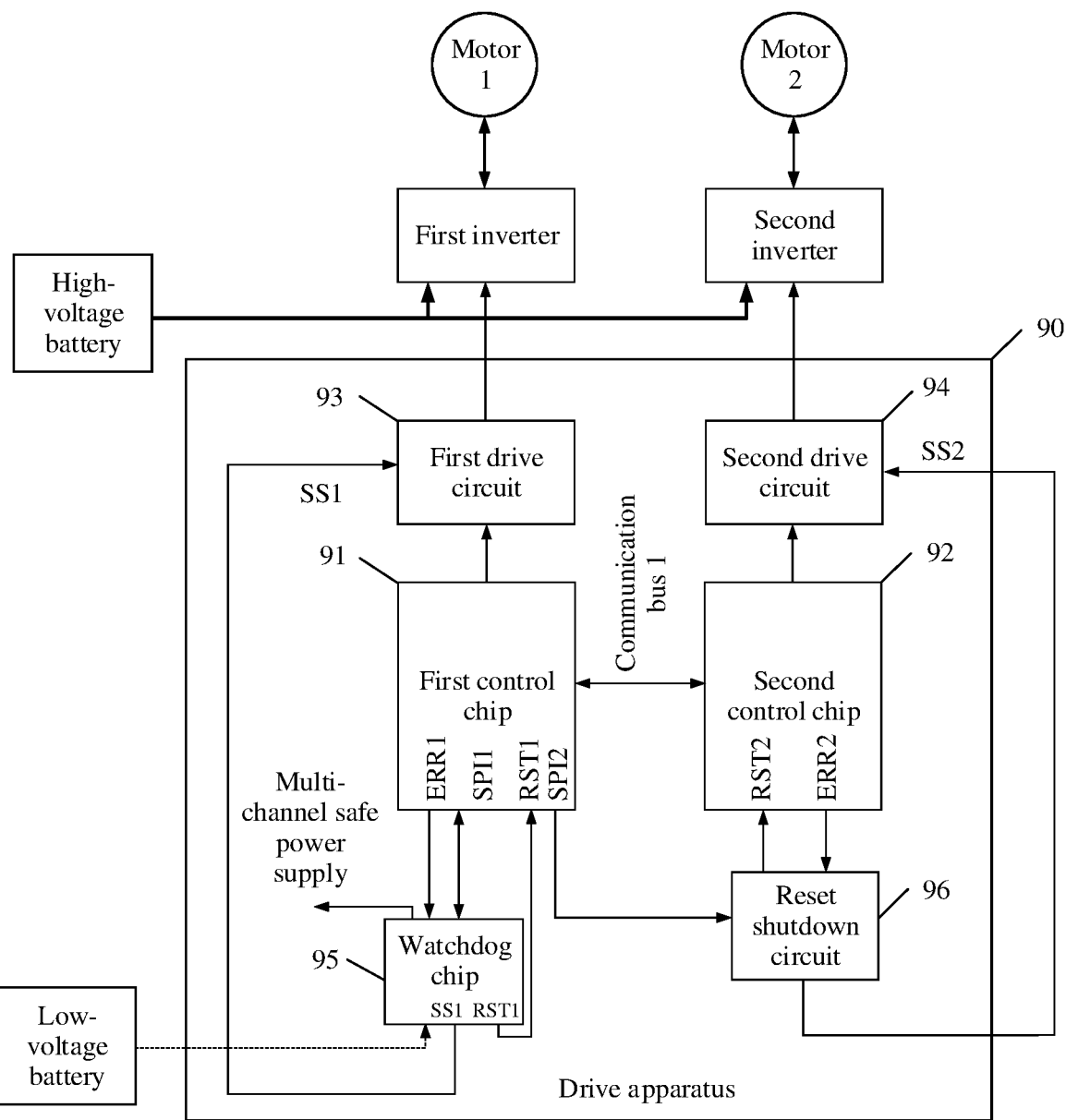
FIG. 9 is a schematic diagram 1 of a structure of a drive apparatus according to Embodiment 2.

FIG. 9 is an example of a schematic diagram of a structure of a drive apparatus according to Embodiment 2. As shown in FIG. 9, in this example, the drive apparatus is used in an electric vehicle. The electric vehicle includes a motor 1, a motor 2, a first inverter configured to supply power to the motor 1, a second inverter configured to supply power to the motor 2, and the drive apparatus. As shown in FIG. 9, in Embodiment 2, the drive apparatus 90 includes a first control chip 91, a second control chip 92, a first drive circuit 93, a second drive circuit 94, a watchdog chip 95, and a reset shutdown circuit 96.

As shown in FIG. 9, the first drive circuit 93 is connected to the first control chip 91 and the watchdog chip 95; the second drive circuit 94 is connected to the second control chip 92 and the reset shutdown circuit 96; the first control chip 91 is separately connected to the second control chip 92, the watchdog chip 95, and the reset shutdown circuit 96; the watchdog chip 95 is connected to the second control chip 92 and the reset shutdown circuit 96; and the reset shutdown circuit 96 is connected to the second control chip 92.

The first drive circuit 93 is configured to generate a drive signal of the first inverter based on signals output by the first control chip 91 and the watchdog chip 95 and output the drive signal to the first inverter. The second drive circuit 94 is configured to generate a drive signal of the second inverter based on signals output by the second control chip 92 and the reset shutdown circuit 96 and output the drive signal to the second inverter. The first control chip 91 is configured to: output a first watchdog feeding signal to the watchdog chip 95, receive a second watchdog feeding signal output by the second control chip 92, perform fault monitoring on the second control chip 92 based on the second watchdog feeding signal, and when determining that the second control chip 92 is faulty, control the reset shutdown circuit 96 to send a first shutdown signal to the second drive circuit 94 and to send a first reset signal to the second control chip 92. The second control chip 92 is configured to send the second watchdog feeding signal to the first control chip 91. The watchdog chip 95 is configured to: supply power to the first control chip 91, the second control chip 92, and the reset shutdown circuit, perform fault monitoring on the first control chip 91 based on the first watchdog feeding signal sent by the first control chip 91, and when the first control chip 91 is faulty, send a second shutdown signal to the first drive circuit 93 and send a second reset signal to the first control chip 91. The reset shutdown circuit 96 is configured to output a shutdown signal to the second drive circuit 94 and output a reset signal to the second control chip 92.

The first shutdown signal is used to shut down drive torque output by the motor 2, the second shutdown signal is used to shut down drive torque output by the motor 1, the first reset signal is used to reset the second control chip 92, and the second reset signal is used to reset the first control chip 91.

In actual application, the electric vehicle further includes a high-voltage battery and a low-voltage battery. The high-voltage battery separately supplies power to the first inverter and the second inverter, and the low-voltage battery supplies power to the watchdog chip 95. The watchdog chip 95 obtains electric energy from the low-voltage battery, outputs a plurality of safe power supply voltages, and supplies power to a plurality of components in the drive apparatus 90 based on the plurality of safe power supply voltages.

Figure 10:
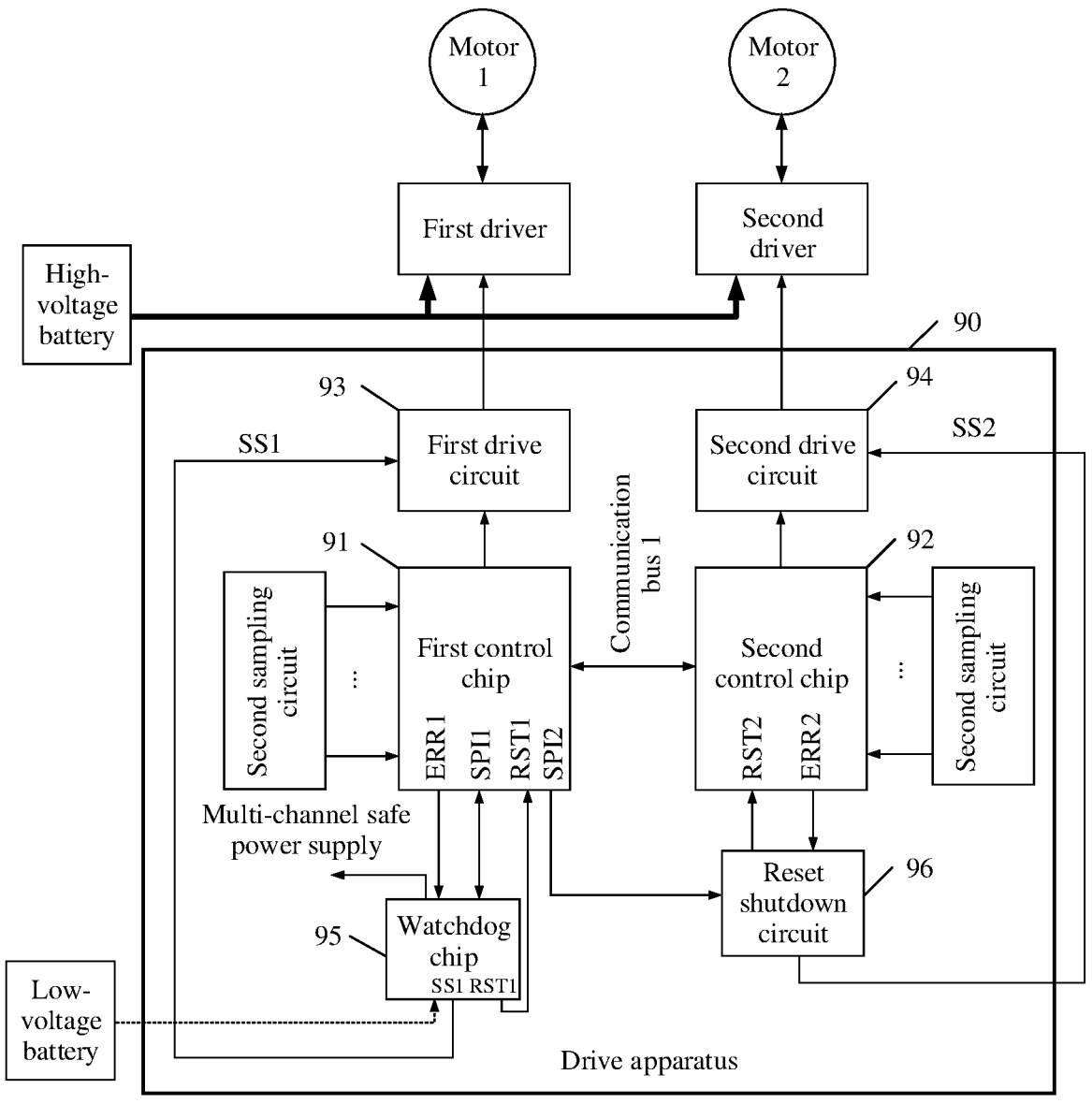
FIG. 10 is a schematic diagram 2 of a structure of a drive apparatus according to Embodiment 2.

As shown in FIG. 10, the drive apparatus 90 may further include a first sampling circuit and a second sampling circuit. The first sampling circuit is connected to the first control chip 91, and the second sampling circuit is connected to the second control chip 92. The first sampling circuit is configured to sample a running parameter of the motor 1 and output the running parameter to the first control chip 91, and the second sampling circuit is configured to sample a running parameter of the motor 2 and output the running parameter to the second control chip 92.

In actual use, the watchdog chip 95 is separately connected to the first sampling circuit and the second sampling circuit, and supply power to the first sampling circuit and the second sampling circuit.

The first control chip 91 may sample the running parameter of the motor 1 by using the first sampling circuit, may calculate a PWM signal of each switch based on the sampled running parameter, and may output the PWM signal to the first drive circuit 93. After receiving the PWM signal, the first drive circuit 93 generates a drive signal of the first inverter, to control the first inverter to supply power to the motor 1, thereby driving the electric vehicle to run. When the motor 1 runs normally, the running parameter of the motor 1 fluctuates within an interval. Therefore, the first control chip 91 may further perform fault diagnosis based on the running parameter and may determine whether the generated PWM signal is accurate. When the running parameter exceeds the interval or the PWM signal is abnormal, the first inverter may be controlled, by controlling and adjusting the drive signal output by the first drive circuit, to shut down the drive torque output by the motor 1. The second drive circuit 94 controls the second inverter to stop supplying power to the motor 2. Similarly, the second control chip 92 samples the running parameter of the motor 2 by using the second sampling circuit, calculates a PWM signal based on the sampled running parameter, and outputs the PWM signal to the second drive circuit 94. After receiving the PWM signal, the second drive circuit 94 generates a drive signal of the second inverter, to control the second inverter to supply power to the motor 2, thereby driving the electric vehicle to run. When the motor runs normally, the running parameter of the motor fluctuates within an interval. Therefore, the second control chip 92 may further perform diagnosis based on the sampled running parameter and may determine whether the generated PWM signal is accurate. When the running parameter exceeds the interval or the PWM signal is abnormal, the second inverter may be controlled, by adjusting the drive signal output by the second drive circuit, to shut down the drive torque output by the motor 2.

The first control chip 91 is connected to the second control chip 92, the first control chip 91 performs a watchdog feeding operation on the watchdog chip 95 by sending the first watchdog feeding signal, and the second control chip 92 performs a watchdog feeding operation on the first control chip 91 by sending the second watchdog feeding signal. The watchdog chip 95 may perform fault status monitoring on the first control chip 91 based on the first watchdog feeding signal, and the first control chip 91 may perform fault status monitoring on the second control chip 92 based on the second watchdog feeding signal. When the first control chip 91 is faulty, the second reset signal may be sent to the first control chip 91 to control the first control chip 91 to be reset to an initial safe state, and the second shutdown signal may be sent to the first drive circuit 93 to shut down the drive torque output by the motor 1, thereby ensuring safety of the electric vehicle. When the second control chip 92 is faulty, the first reset signal may be sent to the second control chip 92 to control the second control chip 92 to be reset to an initial safe state, and the first shutdown signal may be sent to the second drive circuit 94 to shut down the drive torque output by the motor 2, thereby ensuring safety of the electric vehicle. It can be understood that, according to the drive apparatus 90 in Embodiment 2, the watchdog chip 95 may be used to perform fault monitoring on the first control chip 91, and the first control chip 91 may be used to perform fault monitoring on the second control chip 92. Therefore, when no watchdog chip is configured for the second control chip 92, fault monitoring functions of the two control chips are implemented, and corresponding processing is performed when the control chip is faulty, to ensure safety of the electric vehicle.

When detecting that the second control chip 92 is faulty, the first control chip 91 sends, to the reset shutdown circuit 96, a first signal representing that the second control chip 92 is faulty, SPI2 for short below. After receiving the SPI2, the reset shutdown circuit 96 sends the first reset signal, RST2 for short below, to the second control chip 92, and sends the first shutdown signal, SS2 for short below, to the second drive circuit 94. Similarly, when the watchdog chip 95 detects that the first control chip 91 is faulty, the watchdog chip 95 sends the second reset signal, RST1 for short below, to the first control chip 91, and sends the second shutdown signal, SS1 for short below, to the first drive circuit 93.

In the foregoing Embodiment 2, a communication bus 1 is disposed between the first control chip 91 and the second control chip 92, and the communication bus 1 may be separately connected to one or more pins of the first control chip 91 and the second control chip 92. The first control chip 91 receives, through the communication bus 1, the second watchdog feeding signal sent by the second control chip 92. The communication bus 1 may be connected to any pin in an idle state in the control chip. This is not limited herein.

In an example, the watchdog feeding signal may include a time window watchdog signal and a question and answer watchdog signal.

It should be understood that a manner of performing fault monitoring on the second control chip 92 based on the watchdog signal in Embodiment 2 may be the same as the fault monitoring manner in Embodiment 1. Details are not described herein again.

In actual application, when detecting that the first control chip 91 is faulty, the watchdog chip 95 controls the first control chip 91 to be reset to an initial safe state. In this case, the first control chip 91 cannot perform fault monitoring on the second control chip. To prevent the motor 2 from running abnormally due to the fault of the second control chip 92, when detecting that the first control chip 91 is faulty, the watchdog chip 95 may send a third reset signal to the second control chip 92 and send a third shutdown signal to the second drive circuit 94. The third shutdown signal is used to shut down the drive torque output by the motor 2, and the third reset signal is used to reset the second control chip 92.

In an optional manner, the watchdog chip 95 is connected to the second control chip 92 and the second drive circuit 94. When detecting that the first control chip 91 is faulty, the watchdog chip 95 sends the second reset signal to the first control chip 91, sends the third reset signal to the second control chip 92, sends the second shutdown signal to the first drive circuit 93, and sends the third shutdown signal to the second drive circuit 94.

In another optional manner, the watchdog chip 95 is connected to the reset shutdown circuit 96. When the watchdog chip 95 detects that the first control chip 91 is faulty, the watchdog chip 95 sends the second reset signal to the first control chip 91, sends the second shutdown signal to the first drive circuit, controls the reset shutdown circuit 96 to send the third reset signal to the second control chip 92, and controls the reset shutdown circuit 96 to send the third shutdown signal to the second drive circuit 94.

In actual application, the first control chip 91 is further configured to send a first safety exception signal to the watchdog chip 95, and the first safety exception signal represents that a hardware circuit of the first control chip 91 works abnormally. The watchdog chip 95 sends the second shutdown signal to the first drive circuit when receiving the first safety exception signal. The second control chip 92 is further configured to send a second safety exception signal to the reset shutdown circuit 96, and the second safety exception signal represents that a hardware circuit of the second control chip 95 works abnormally. The reset shutdown circuit 96 sends the first shutdown signal to the second drive circuit when receiving the second safety exception signal.

It can be understood from the foregoing description that, when the second control chip 92 is faulty, safety of the electric vehicle may be ensured by sending a corresponding reset signal and a corresponding shutdown signal by using the reset shutdown circuit 96. The following describes in detail a process of outputting the reset signal and the shutdown signal by the reset shutdown circuit 96.

Figure 11:
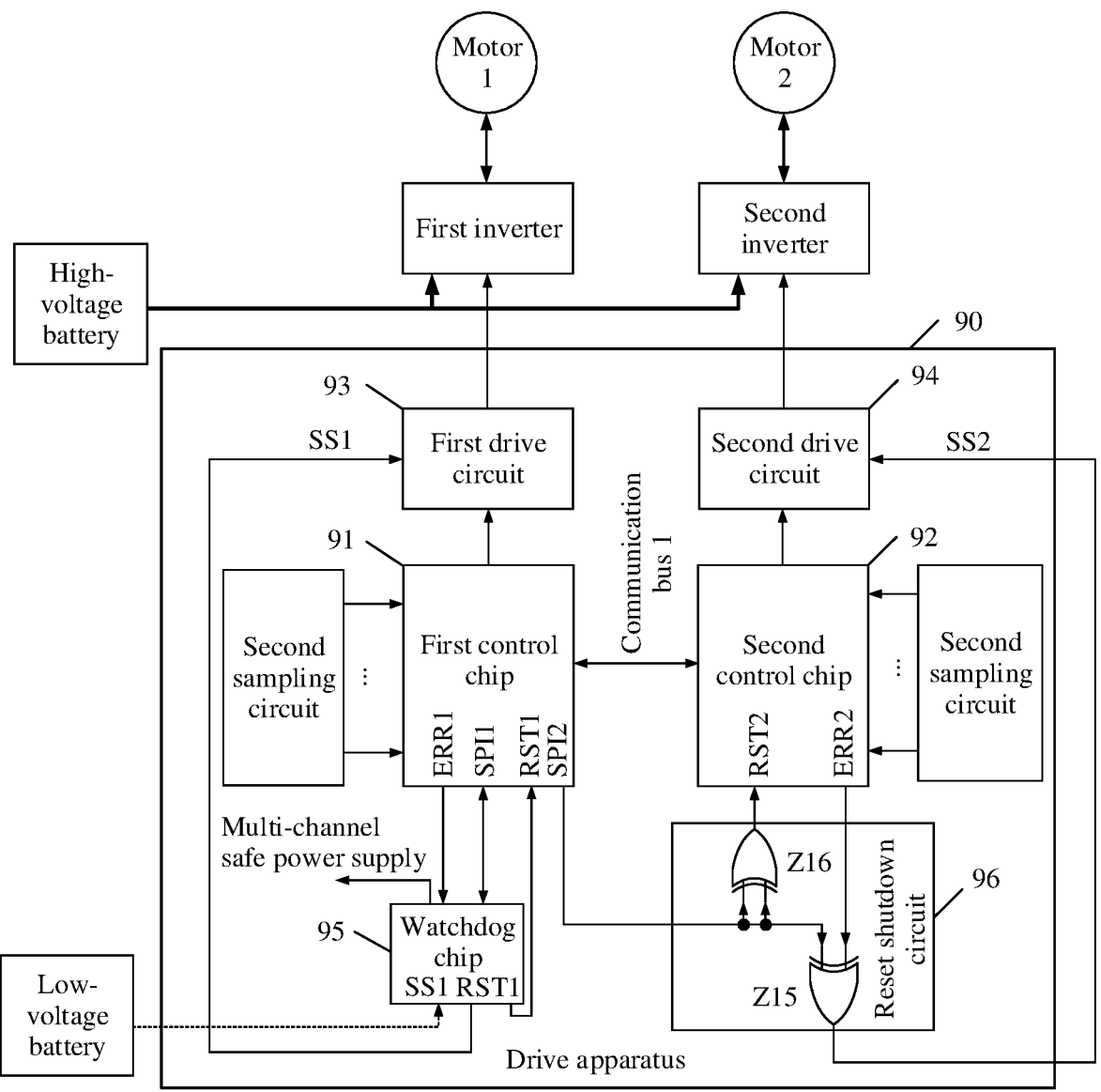
FIG. 11 is a schematic diagram 1 of a structure of a reset shutdown circuit according to Embodiment 2.
Figure 12:
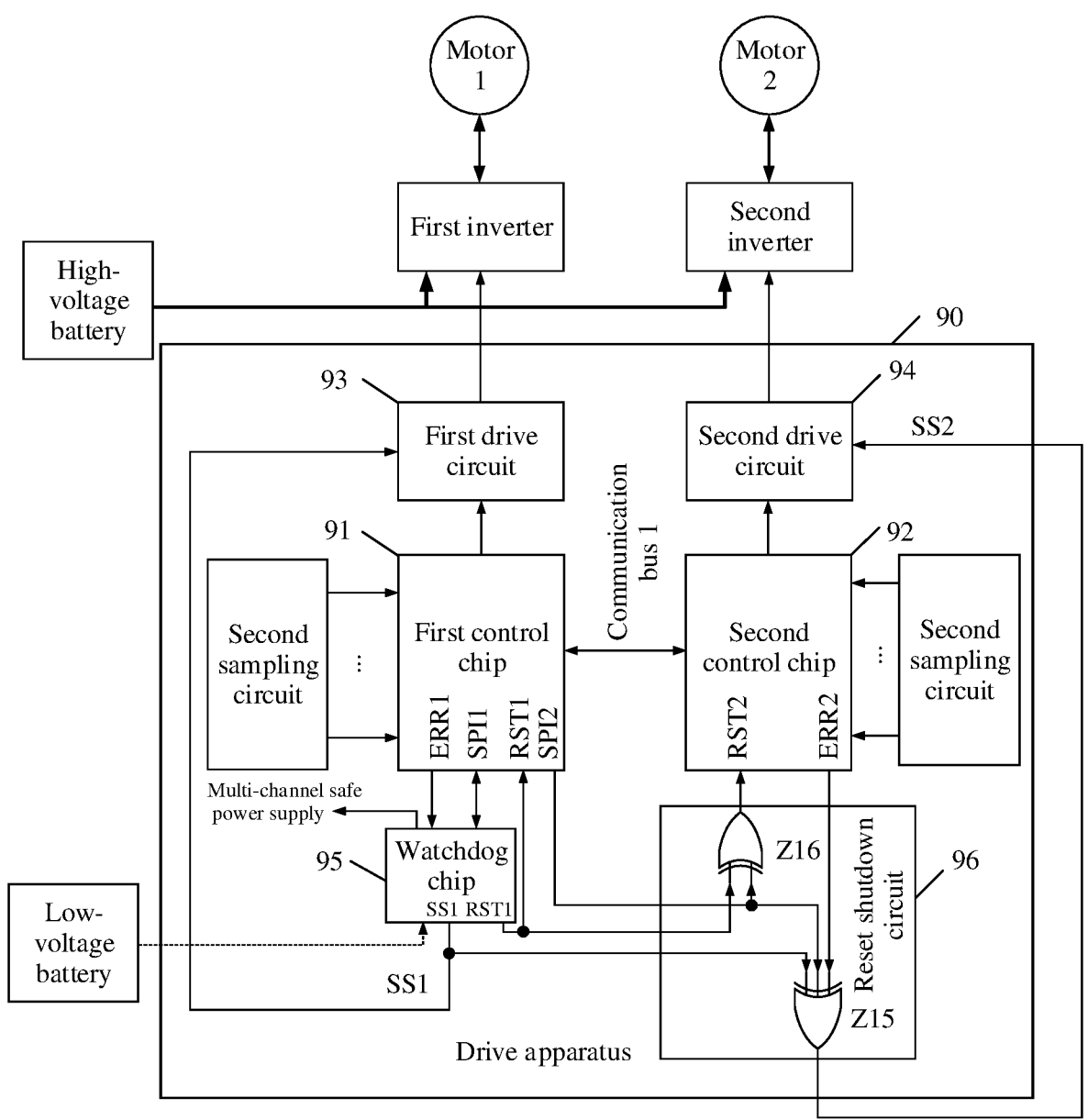
FIG. 12 is a schematic diagram 2 of a structure of a reset shutdown circuit according to Embodiment 2.

As shown in FIG. 11, he reset shutdown circuit 96 may include a first OR gate circuit Z15 and a second OR gate circuit Z16.

A connection relationship between components in the reset shutdown circuit 96 is as follows: A first input terminal of the first OR gate circuit Z15 is connected to the second control chip 92, a second input terminal of the first OR gate circuit Z15 is connected to the first control chip 91, and an output terminal of the first OR gate circuit Z15 is connected to the second drive circuit 94; and a first input terminal of the second OR gate circuit Z16 is connected to the first control chip 91, and an output terminal of the second OR gate circuit Z16 is connected to a reset terminal of the second control chip 92.

The Z15 generates the first shutdown signal SS2 of the second drive circuit 94, and outputs the SS2 to the second drive circuit 94 through the output terminal; and the Z16 generates the first reset signal RST2 of the second control chip 92, and outputs the RST2 to the second control chip 92 through the output terminal.

For a mapping relationship between an input signal and an output signal of the reset shutdown circuit, see Table 2. When the input signal of the reset shutdown circuit is determined, statues of the reset signal and the shutdown signal output by the reset shutdown circuit may be determined with reference to Table 2. 1 may represent a high-level signal, 0 represents a low-level signal, and X is either 0 or 1 An example in which the high-level signal is a valid signal is used for description.

TABLE 2

| Correspondence between the input signal and the output signal of the reset shutdown circuit | | | |
| --- | --- | --- | --- |
| ERR2 | SPI2 | RST2 | SS2 |
| 1 | X | 1 | 0 |
| 0 | 0 | 0 | 1 |
| 0 | 1 | 1 | 1 |
| 0 | 0 | 0 | 0 |
| 0 | 0 | 0 | 0 |

When the first control chip 91 detects that the second control chip 92 is faulty, the first control chip 91 outputs the high-level signal to the Z15 and the Z16. In this case, the output terminal of the Z16 sends the RST2 for reset to the reset terminal of the second control chip 92, to control the second control chip 92 to perform a reset operation. The output terminal of the Z15 sends the SS2 signal to the second drive circuit 94. When receiving the SS2, the second drive circuit 94 stops providing drive signals for all or some switches in the inverter, to control the second inverter to shut down the drive torque output by the motor 2, thereby ensuring safety of the electric vehicle.

When a hardware safety circuit for performing safety monitoring in the second control chip 92 works abnormally, the second control chip 91 outputs an ERR2 of a high-level signal to an input terminal of the Z15. In this case, the output terminal of the Z15 sends the SS2 to the second drive circuit 94. When receiving the SS2, the second drive circuit 94 adjusts the drive signal output by the second inverter, to control the second inverter to shut down the drive torque output by the motor 2, thereby ensuring safety of the electric vehicle.

In an example, when the watchdog chip 95 detects that the first control chip 91 is faulty, after being reset, the first control chip 91 cannot monitor a fault status of the second control chip 92. To prevent a potential safety hazard caused by running of the motor 2 when the second control chip 92 is faulty, the watchdog chip 95 also controls the second control chip 92 to reset and shut down the drive torque output by the motor 2. A third input terminal of the first OR gate circuit Z15 may be connected to a pin that outputs the SS2 in the watchdog chip 95, and a second input terminal of the second OR gate circuit Z16 is connected to a pin that outputs the RST1 in the watchdog chip.

Figure 13:
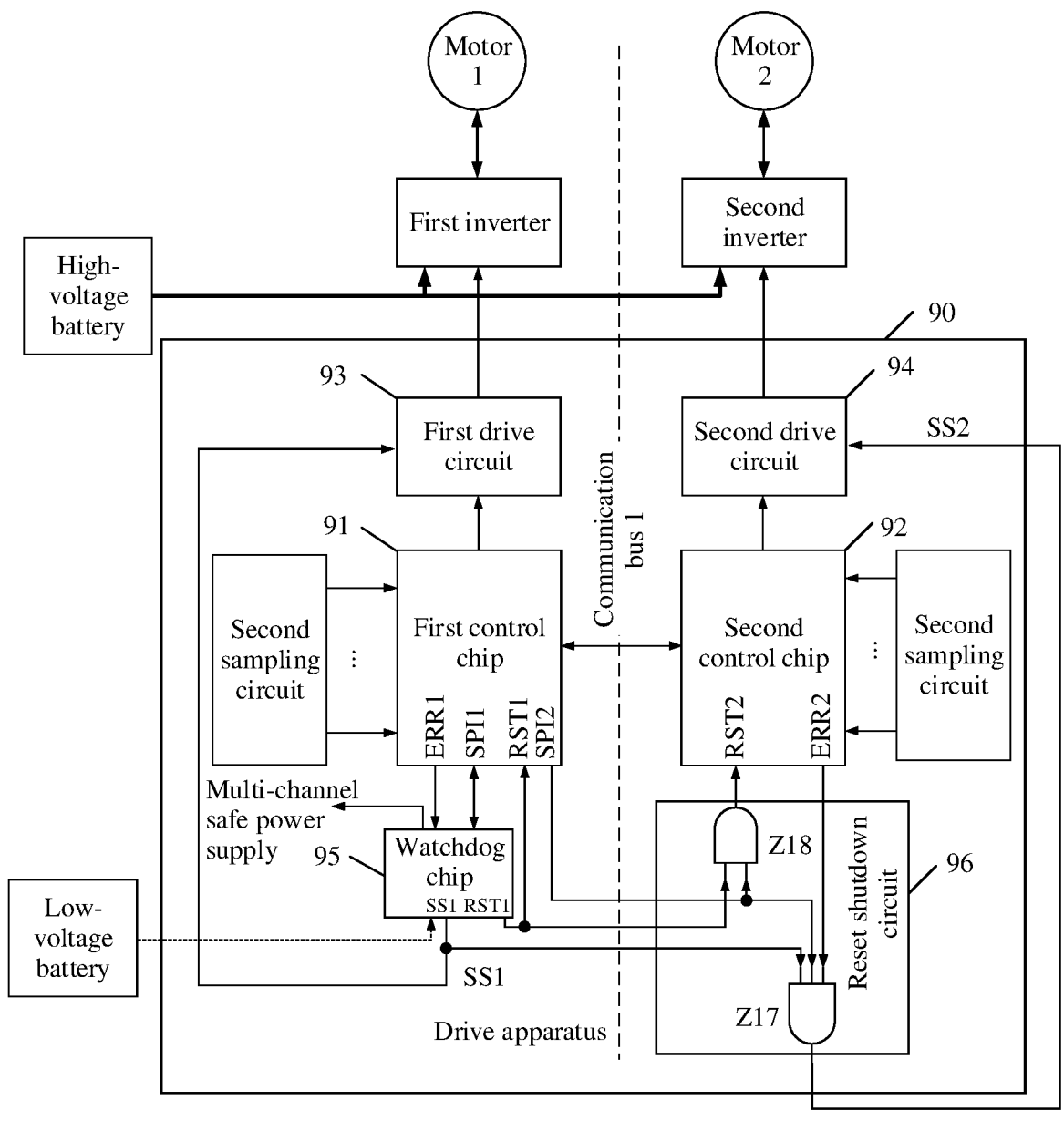
FIG. 13 is a schematic diagram 3 of a structure of a reset shutdown circuit according to Embodiment 2.

It should be understood that, the foregoing is only an implementation in which the high-level signal is valid. In another implementation, a logic gate circuit in which a low-level signal is valid may be selected in the reset shutdown circuit 96 to implement outputs of the shutdown signal and the reset signal. For example, for a circuit structure of the reset shutdown circuit 96. As shown in FIG. 13, the reset shutdown circuit includes a first AND gate circuit Z17 and a second AND gate circuit Z18.

A first input terminal of the first AND gate circuit Z17 is connected to the second control chip 92, a second input terminal of the first AND gate circuit Z17 is connected to the first control chip 91, and an output terminal of the first AND gate circuit Z17 is connected to the second drive circuit 94; and a first input terminal of the second AND gate circuit Z12 is connected to the first control chip 91, and an output terminal of the second AND gate circuit Z18 is connected to a reset terminal of the second control chip 92.

It should be noted that the foregoing description of the reset shutdown circuit is merely an example. In actual use, the drive circuit may stop providing drive signals for all or some switches in the inverter, to shut down the drive torque output by the motor. According to the shutdown manner of the drive torque output by the motor, the reset shutdown circuit may alternatively use another logical circuit structure.

According to the solution provided in Embodiment 2, an electric vehicle may include wheels, a first motor, a second motor, a first inverter configured to supply power to the first motor, a second inverter configured to supply power to the second motor, and the drive apparatus 90.

Embodiment 3

Figure 14:
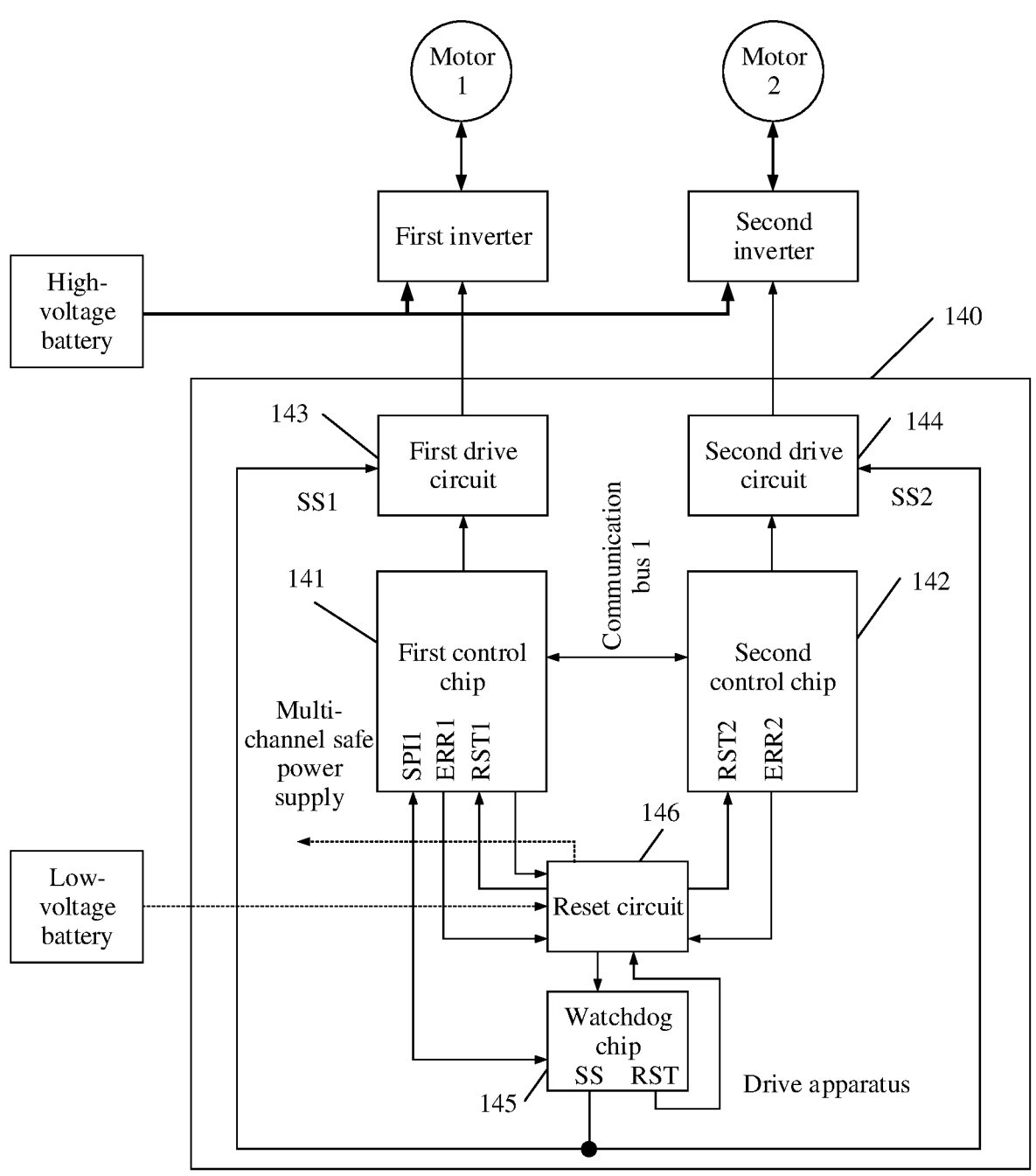
FIG. 14 is a schematic diagram 1 of a structure of a drive apparatus according to Embodiment 3.

FIG. 14 is an example of a schematic diagram of a structure of a drive apparatus according to Embodiment 3. As shown in FIG. 14, in this example, the drive apparatus is used in an electric vehicle. The electric vehicle includes a motor 1, a motor 2, a first inverter configured to supply power to the motor 1, a second inverter configured to supply power to the motor 2, and the drive apparatus. As shown in FIG. 14, in Embodiment 3, the drive apparatus 140 includes a first control chip 141, a second control chip 142, a first drive circuit 143, a second drive circuit 144, a watchdog chip 145, and a reset circuit 146.

As shown in FIG. 14, the first drive circuit 143 may be connected to the first control chip 141 and the watchdog chip 145; the second drive circuit 144 may be connected to the second control chip 142 and the watchdog chip 145; the first control chip 141 may be separately connected to the second control chip 142, the watchdog chip 145, and the reset circuit 146; the watchdog chip 145 may be separately connected to the second control chip 142 and the reset circuit 146; and the reset circuit 146 may be connected to the first control chip 141 and the second control chip 142.

The first drive circuit 143 is configured to generate a drive signal of the first inverter based on signals output by the first control chip 141 and the watchdog chip 145 and output the drive signal to the first inverter. The second drive circuit 144 is configured to generate a drive signal of the second inverter based on signals output by the second control chip 142 and the watchdog chip 145 and output the drive signal to the second inverter. The first control chip 141 is configured to send a first watchdog feeding signal to the watchdog chip 145, receive a second watchdog feeding signal sent by the second control chip 142, perform fault monitoring on the second control chip 142 based on the second watchdog feeding signal, and when the second control chip 142 is faulty, control, by using the reset circuit 146, the watchdog chip 145 to send a first shutdown signal to the first drive circuit 143 and to send a second shutdown signal to the second drive circuit 144 and control the reset circuit 146 to send a first reset signal to the first control chip 141 and to send a second reset signal to the second control chip 142. The second control chip 142 is configured to send the second watchdog feeding signal to the first control chip 141. The watchdog chip 145 is configured to supply power to the first control chip 141, the second control chip 142, and the reset circuit 146, perform fault monitoring on the first control chip 141 based on the first watchdog feeding signal sent by the first control chip 141, and when determining that the first control chip 141 is faulty, send a first shutdown signal to the first drive circuit 143 and send a second shutdown signal to the second drive circuit 144 and control the reset circuit 146 to send a first reset signal to the first control chip 141 and to send a second reset signal to the second control chip 142. The reset circuit 146 is configured to send the first reset signal to the first control chip 141, send the second reset signal to the second control chip 142, control the watchdog chip 145 to send the first shutdown signal to the first drive circuit 143, and output the second shutdown signal to the second drive circuit 144.

The first shutdown signal is used to shut down output torque of the motor 1, the second shutdown signal is used to shut down output torque of the motor 2, the first reset signal is used to reset the first control chip 141, and the second reset signal is used to reset the second control chip 142.

In actual application, the electric vehicle further includes a high-voltage battery and a low-voltage battery. The high-voltage battery separately supplies power to the first inverter and the second inverter, and the low-voltage battery supplies power to the watchdog chip 145. The watchdog chip 145 obtains electric energy from the low-voltage battery, outputs a plurality of safe power supply voltages, and supplies power to a plurality of components in the drive apparatus 140 based on the plurality of safe power supply voltages.

Figure 15:
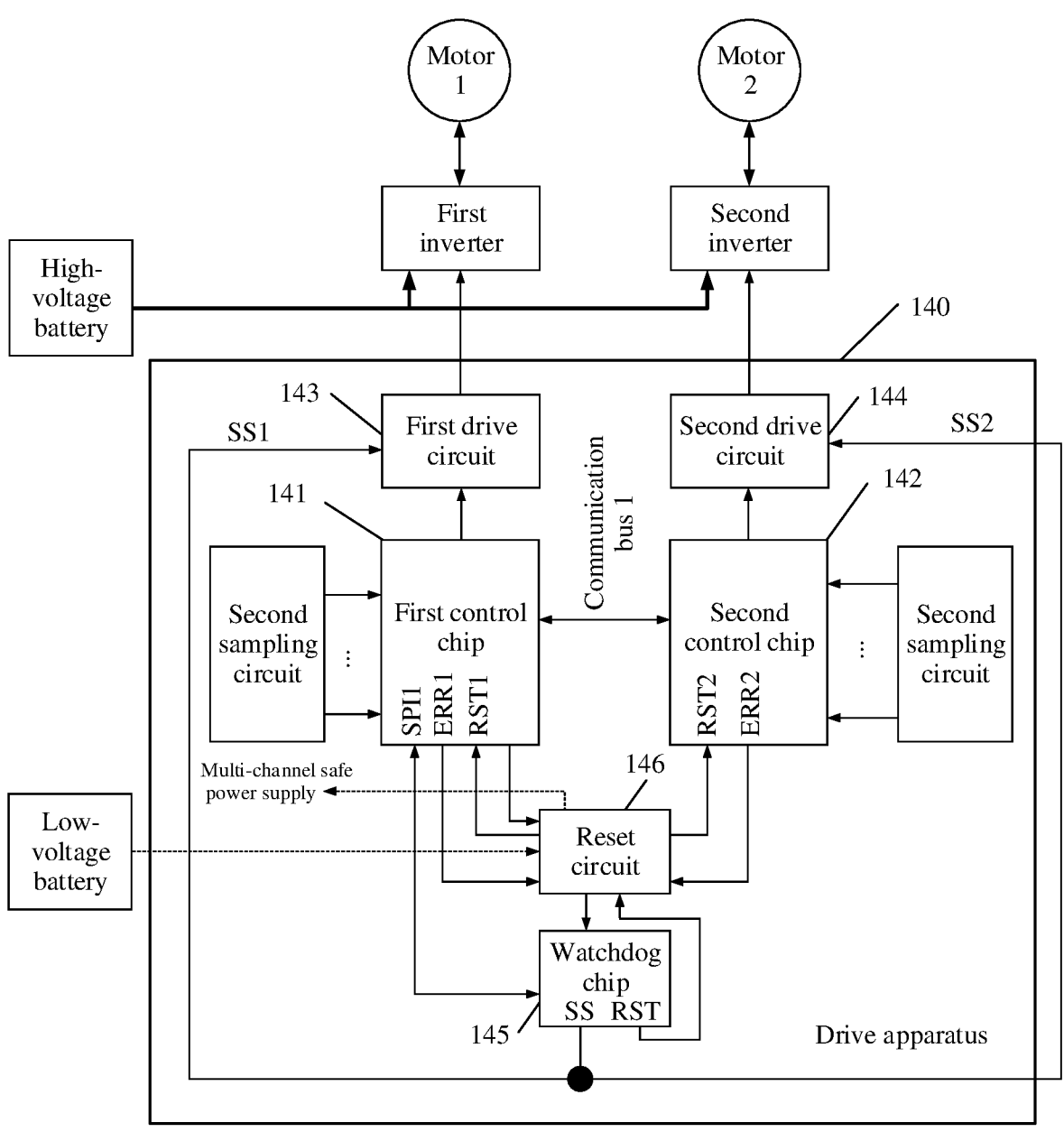
FIG. 15 is a schematic diagram 2 of a structure of a drive apparatus according to Embodiment 3.

As shown in FIG. 15, the drive apparatus 140 may further include a first sampling circuit and a second sampling circuit. The first sampling circuit is connected to the first control chip 141, and the second sampling circuit is connected to the second control chip 142. The first sampling circuit is configured to sample a running parameter of the motor 1 and output the running parameter to the first control chip 141, and the second sampling circuit is configured to sample a running parameter of the motor 2 and output the running parameter to the second control chip 142.

In actual use, the watchdog chip 145 may be separately connected to the first sampling circuit and the second sampling circuit, and supply power to the first sampling circuit and the second sampling circuit.

The first control chip 141 may sample the running parameter of the motor 1 by using the first sampling circuit, may calculate a PWM signal of each switch based on the sampled running parameter, and may output the PWM signal to the first drive circuit 143. After receiving the PWM signal, the first drive circuit 143 generates a drive signal of the first inverter, to control the first inverter to supply power to the motor 1, thereby driving the electric vehicle to run. When the motor 1 runs normally, the running parameter of the motor 1 fluctuates within an interval. Therefore, the first control chip 141 may further perform fault diagnosis based on the running parameter and determine whether the generated PWM signal is accurate. When the running parameter exceeds the interval or the PWM signal is abnormal, the first inverter may be controlled, by adjusting the drive signal output by the first drive circuit 143, to shut down the drive torque output by the motor 1. Similarly, the second control chip 142 samples the running parameter of the motor 2 by using the second sampling circuit, calculates a PWM signal based on the sampled running parameter, and outputs the PWM signal to the second drive circuit 144. After receiving the PWM signal, the second drive circuit 144 generates a drive signal of the second inverter, to control the second inverter to supply power to the motor 2, thereby driving the electric vehicle to run. When the motor runs normally, the running parameter of the motor fluctuates within an interval. Therefore, the second control chip 142 may further perform diagnosis based on the sampled running parameter and may determine whether the generated PWM signal is accurate. When the running parameter exceeds the interval or the PWM signal is abnormal, the second inverter may be controlled, by adjusting the drive signal output by the second drive circuit 144, to shut down the drive torque output by the motor 2.

The first control chip 141 is connected to the second control chip 142, the first control chip 141 performs a watchdog feeding operation on the watchdog chip 145 by sending the first watchdog feeding signal, and the second control chip 142 performs a watchdog feeding operation on the first control chip 141 by sending the second watchdog feeding signal. The watchdog chip 145 may perform fault status monitoring on the first control chip 141 based on the second watchdog feeding signal, and the first control chip 141 may perform fault status monitoring on the second control chip 142 based on the second watchdog feeding signal. When the first control chip 141 or the second control chip 142 is faulty, the first reset signal may be sent to the first control chip 141, the second reset signal may be sent to the second control chip 142, the first shutdown signal may be sent to the first drive circuit 143, and the second shutdown signal may be sent to the second drive circuit 144. In this case, both the first control chip 141 and the second control chip 142 are reset to an initial safe state, and the drive torque output by the motor 1 and the drive torque of the motor 2 are shut down, thereby ensuring safety of the electric vehicle. It can be understood that, according to the drive apparatus 140 in Embodiment 3, the watchdog chip 145 may be used to perform fault monitoring on the first control chip 141, and the first control chip 141 may be used to perform fault monitoring on the second control chip 142. Therefore, when no watchdog chip is configured for the second control chip 142, fault monitoring functions of the two control chips are implemented, and corresponding processing is performed when the control chip is faulty, to ensure safety of the electric vehicle.

As shown in FIG. 14 or FIG. 15, when detecting that the second control chip 142 is faulty, the first control chip 141 sends, to the reset circuit 146, a first signal representing that the second control chip 142 is faulty, SP12 for short below. The reset circuit 146 sends the first reset signal, RST1 for short below, to the first control chip 141, sends the second reset signal, RST2 for short below, to the second control chip, and controls the watchdog chip 145 to send the first shutdown signal, SS1 for short below, to the first drive circuit 143, and to send a second shutdown signal, SS2 for short below, to the second drive circuit 144. Similarly, when the watchdog chip 145 detects that the first control chip 141 is faulty, the watchdog chip 145 sends the SS1 to the first drive circuit 143, sends the SS2 to the second drive circuit 144, controls the reset circuit 146 to send the RST1 to the first control chip 141, and controls the reset circuit 146 to send the RST2 to the second control circuit 142.

In the foregoing Embodiment 3, a communication bus 1 is disposed between the first control chip 141 and the second control chip 142, and the communication bus 1 may be separately connected to one or more pins of the first control chip 141 and the second control chip 142. The first control chip 141 receives, through the communication bus 1, the second watchdog feeding signal sent by the second control chip 142. The communication bus 1 may be connected to any pin in an idle state in the control chip. This is not limited herein.

In an example, the watchdog feeding signal may include a time window watchdog signal and a question and answer watchdog signal.

It should be understood that a manner of performing fault monitoring on the second control chip 142 based on the watchdog signal in Embodiment 3 may be the same as the fault monitoring manner in Embodiment 1. Details are not described herein again.

In an optional solution, the first control chip 141 is further configured to send a first safety exception signal to the reset circuit 146, and the first safety exception signal represents that a hardware circuit of the first control chip 141 works abnormally and is referred to as ERR1 for short below. The second control chip 142 is further configured to send a second safety exception signal to the reset circuit 146, and the second safety exception signal represents that a hardware circuit of the second control chip 142 works abnormally and is referred to as ERR2 for short below. The reset circuit 146 controls: when the first safety exception signal or the second safety exception signal is received, the watchdog chip 145 is controlled to send the first shutdown signal to the first drive circuit 143 and to send the second shutdown signal to the second drive circuit 144.

It can be understood from the foregoing description that when the second control chip 142 is faulty, safety of the electric vehicle may be implemented based on the shutdown signal sent by the watchdog chip 145 and the reset signal sent by the reset circuit 146. The following describes in detail a working process of the reset circuit 146.

Figure 16:
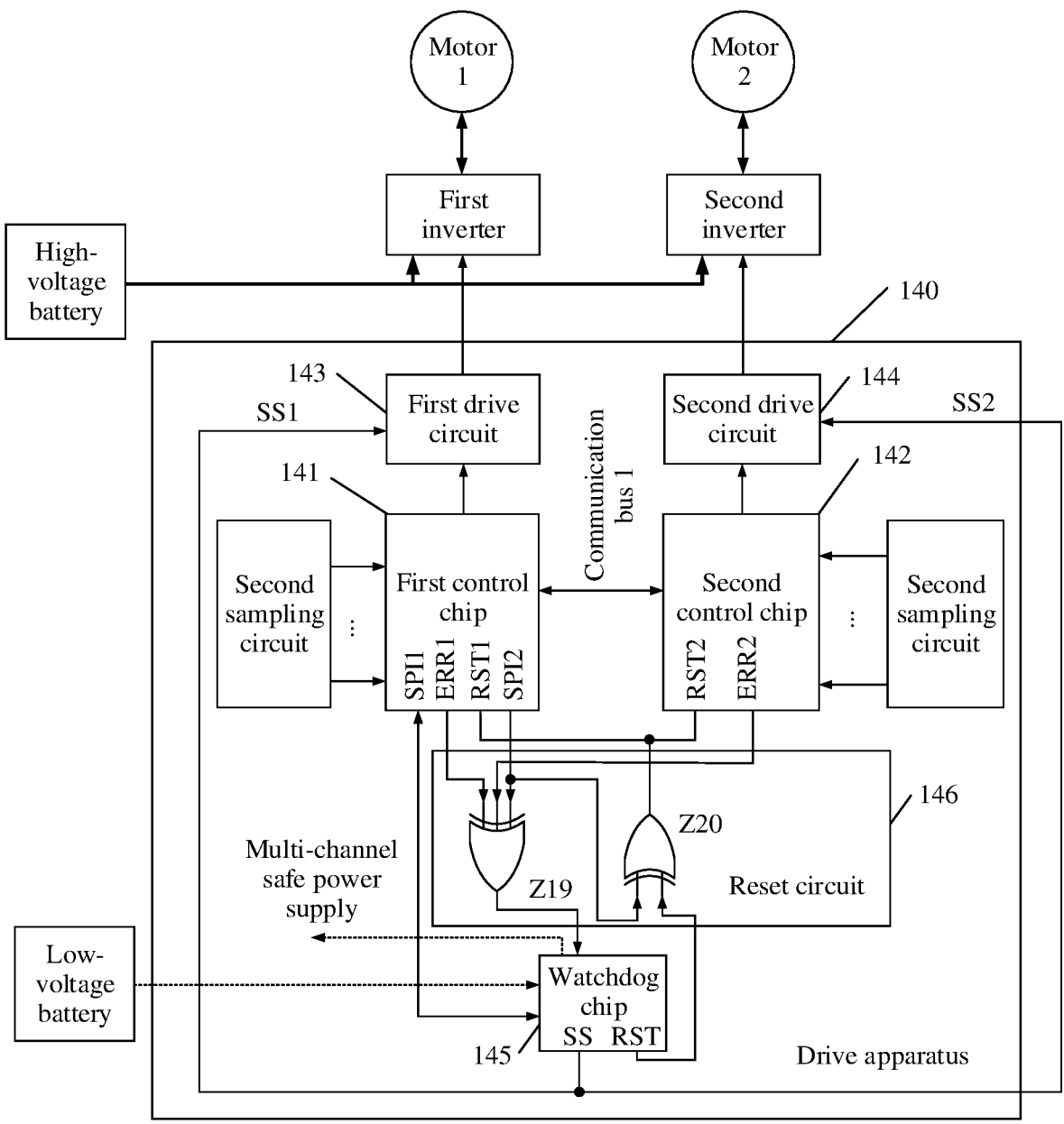
FIG. 16 is a schematic diagram 1 of a structure of a reset circuit according to Embodiment 3.

As shown in FIG. 16, the reset circuit 146 may include a first OR gate circuit Z19 and a second OR gate circuit Z20.

A connection relationship between components in the reset circuit 146 may be as follows: A first input terminal of the first OR gate circuit Z19 is connected to the first control chip 141, a second input terminal of the first OR gate circuit Z19 is connected to the second control chip 142, a third input terminal of the first OR gate circuit Z19 is connected to the first control chip 141, and an output terminal of the first OR gate circuit Z19 is connected to the watchdog chip 145; and a first input terminal of the second OR gate circuit Z20 is connected to the watchdog chip 145, a second input terminal of the second OR gate circuit Z20 is connected to the first control chip 141, and an output terminal of the second OR gate circuit Z20 is separately connected to a reset terminal of the first control chip and a reset terminal of the second control chip.

The Z19 generates a control signal used to control the watchdog chip 145 to send the SS1 and the SS2, and outputs the control signal to the watchdog chip 145 through the output terminal. The Z20 generates the reset signal RST1 of the first control chip 141 and the reset signal RST2 of the second control chip 142, and respectively outputs the RST1 and RST2 to the first control chip 141 and the second control chip 142 through the output terminal.

For a correspondence between the shutdown signal, the reset signal, and the reset circuit, see Table 3. After a plurality of signals are obtained, states of the reset signal and the shutdown signal may be determined with reference to Table 3. 1 may represent a high-level signal, 0 represents a low-level signal, and X is either 0 or 1. An example in which the high-level signal is a valid signal is used for description.

TABLE 3

| Correspondence between the reset circuit, the reset signal, and the shutdown signal | | | | | | |
| --- | --- | --- | --- | --- | --- | --- |
| ERR1 | SPI2 | ERR2 | RST1 | SS1 | RST2 | SS2 |
| 1 | 0 | 0 | 1 | 1 | 1 | 0 |
| 0 | 0 | 1 | 1 | 1 | 1 | 1 |
| 0 | 1 | 0 | 1 | 1 | 1 | 1 |
| 0 | 0 | 0 | 0 | 0 | 0 | 0 |

When the first control chip 141 detects that the second control chip 142 is faulty, the first control chip 141 outputs the high-level signal SPI2 to the Z19 and the Z20. In this case, the output terminal of the Z19 sends, to the watchdog chip 145, the control signal used to control the watchdog chip 145 to send the SS1 and the SS2. After receiving the signal, the watchdog chip 145 sends the SS1 to the first drive circuit 143 and sends the SS2 to the second drive circuit 144. The output terminal of the Z20 outputs the reset signal RST1 to the reset terminal of the first control chip 141 and the reset signal RST2 to the reset terminal of the second control chip 142, and the first control chip 141 and the second control chip 142 are reset to the initial safe state. In this case, the first inverter shuts down the drive torque output by the motor 1, and the second inverter shuts down the drive torque output by the motor 2, to ensure safety of the electric vehicle.

When a hardware safety circuit that is inside the first control chip 141 or the second control chip 142 and that performs safety monitoring works abnormally, the first control chip 141 or the second control chip 142 outputs an ERR1 or an ERR2 of a high-level signal to an input terminal of the Z13. In this case, the output terminal of the Z19 sends, to the watchdog chip 145, the control signal used to control the watchdog chip 145 to send the SS1 and the SS2. After receiving the signal, the watchdog chip 145 sends the SS1 to the first drive circuit 143 and sends the SS2 to the second drive circuit 144. In this case, the first inverter shuts down the drive torque output by the motor 1, and the second inverter shuts down the drive torque output by the motor 2, to ensure safety of the electric vehicle.

When the watchdog chip 145 detects that the first control chip 141 is faulty, the watchdog chip 145 directly sends the SS1 signal to the first drive circuit 143, sends the SS2 signal to the second drive circuit 144, and further sends the high-level signal to the input terminal of the Z20. In this case, the Z20 sends the RST1 to the reset terminal of the first control chip 141 and sends the RST2 to the reset terminal of the second control chip 142. After receiving the reset signal, the first control chip 141 and the second control chip 142 are reset to the initial safe state.

Figure 17:
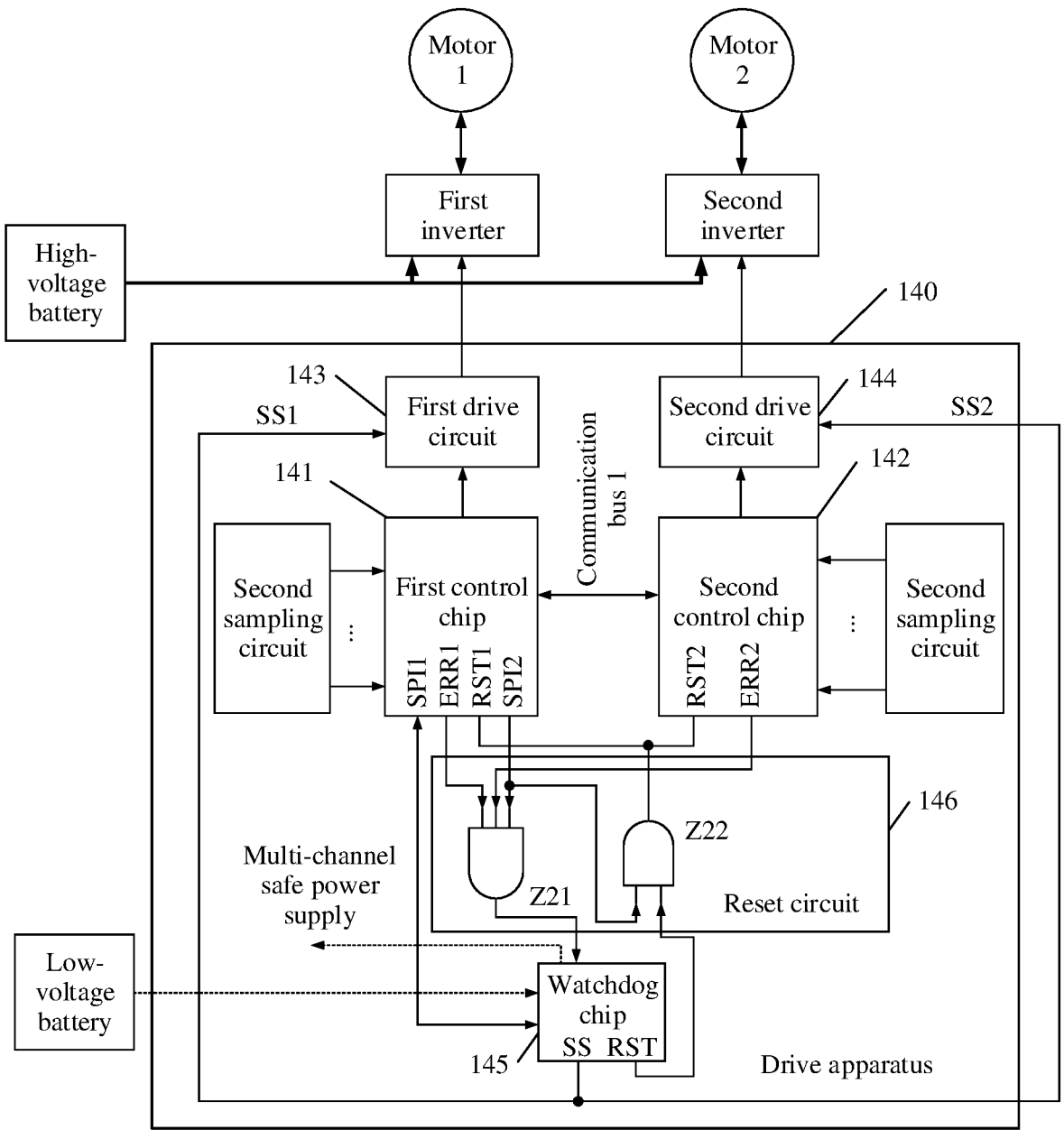
FIG. 17 is a schematic diagram 2 of a structure of a reset circuit according to Embodiment 3.

It should be understood that, the foregoing is only an implementation in which the high-level signal is valid. In another implementation, a logic gate circuit in which a low-level signal is valid may be selected in the reset circuit 146 to implement outputs of the signals. For example, see a circuit structure of the reset circuit 146. As shown in FIG. 17, the reset circuit may include a first AND gate circuit Z21 and a second AND gate circuit Z22.

A connection relationship between components in the reset circuit 146 may be as follows: A first input terminal of the first AND gate circuit Z21 is connected to the first control chip 141, a second input terminal of the first AND gate circuit Z21 is connected to the second control chip 142, a third input terminal of the first AND gate circuit Z21 is connected to the first control chip 141, and an output terminal of the first AND gate circuit Z21 is connected to the watchdog chip 145; and a first input terminal of the second AND gate circuit Z22 is connected to the watchdog chip 145, a second input terminal of the second AND gate circuit Z22 is connected to the first control chip 141, and an output terminal of the second AND gate circuit Z22 is separately connected to a reset terminal of the first control chip and a reset terminal of the second control chip.

It should be noted that the foregoing description of the reset circuit is merely an example. In actual use, the drive circuit may stop providing drive signals for all or some switches in the inverter, to shut down the drive torque output by the motor. According to the shutdown manner of the drive torque of the motor, the reset shutdown circuit may alternatively use another logical circuit structure.

According to the solution provided in Embodiment 3, this application further provides an electric vehicle, including wheels, a first motor, a second motor, a first inverter configured to supply power to the first motor, a second inverter configured to supply power to the second motor, and the drive apparatus 140.

It is clear that a person skilled in the art can make various modifications and variations without departing from the scope of the embodiments and their equivalent technologies.

The invention claimed is:

1. A drive apparatus, used in an electric vehicle, wherein the electric vehicle comprises a first motor, a second motor, a first inverter configured to supply power to the first motor, a second inverter configured to supply power to the second motor, and the drive apparatus, and the drive apparatus comprises a first control chip, a second control chip, a first drive circuit, a second drive circuit, a watchdog chip, and a reset shutdown circuit;

the first drive circuit is configured to generate a drive signal of the first inverter based on signals output by the first control chip and the reset shutdown circuit;

the second drive circuit is configured to generate a drive signal of the second inverter based on signals output by the second control chip and the reset shutdown circuit;

the first control chip is configured to:

send a first watchdog feeding signal to the second control chip, receive a second watchdog feeding signal sent by the second control chip, perform fault monitoring on the second control chip based on the second watchdog feeding signal, and when the second control chip is faulty, control the reset shutdown circuit to send a first shutdown signal to the second drive circuit and to send a first reset signal to the second control chip, wherein the first shutdown signal is used to shut down drive torque output by the second motor, and the first reset signal is used to reset the second control chip;

the second control chip is configured to:

receive the first watchdog feeding signal, send the second watchdog feeding signal to the first control chip, perform fault monitoring on the first control chip based on the first watchdog feeding signal, and when the first control chip is faulty, control the reset shutdown circuit to send a second shutdown signal to the first drive circuit and to send a second reset signal to the first control chip, wherein the second shutdown signal is used to shut down drive torque output by the first motor, and the second reset signal is used to reset the first control chip; and the watchdog chip is configured to supply power to the first control chip, the second control chip, and the reset shutdown circuit.

2. The drive apparatus according to claim 1, wherein the first control chip is further configured to output a third watchdog feeding signal to the watchdog chip when determining that the second control chip is faulty; and the watchdog chip is further configured to:

receive the third watchdog feeding signal, perform fault monitoring on the first control chip based on the third watchdog feeding signal, and when determining that the first control chip is faulty, control the reset shutdown circuit to send the second reset signal to the first control chip and to send the second shutdown signal to the first drive circuit.

3. The drive apparatus according to claim 1, wherein the second control chip is further configured to output a fourth watchdog feeding signal to the watchdog chip when determining that the first control chip is faulty; and the watchdog chip is further configured to:

receive the fourth watchdog feeding signal, perform fault monitoring on the second control chip based on the fourth watchdog feeding signal, and when determining that the second control chip is faulty, control the reset shutdown circuit to send the first reset signal to the second control chip and to send the first shutdown signal to the second drive circuit.

4. The drive apparatus according to claim 3, wherein the first control chip is further configured to send a first safety exception signal to the reset shutdown circuit, and the first safety exception signal represents that a hardware circuit of the first control chip works abnormally;

the second control chip is further configured to send a second safety exception signal to the reset shutdown circuit, and the second safety exception signal represents that a hardware circuit of the second control chip works abnormally; and the reset shutdown circuit is further configured to:

send the second shutdown signal to the first drive circuit when receiving the first safety exception signal, and send the first shutdown signal to the second drive circuit when receiving the second safety exception signal.

5. The drive apparatus according to claim 4, further comprising:

a first sampling circuit configured to sample a running parameter of the first motor and output the running parameter to the first control chip; and a second sampling circuit is configured to sample a running parameter of the second motor and output the running parameter to the second control chip, wherein the watchdog chip is further configured to supply power to the first sampling circuit and the second sampling circuit.

6. The drive apparatus according to claim 4, wherein the reset shutdown circuit comprises:

a first OR gate circuit, a second OR gate circuit, a third OR gate circuit, and a fourth OR gate circuit;

a first input terminal of the first OR gate circuit is connected to the first control chip, a second input terminal of the first OR gate circuit is connected to the second control chip, and an output terminal of the first OR gate circuit is connected to the first drive circuit;

a first input terminal of the second OR gate circuit is connected to the second control chip, a second input terminal of the second OR gate circuit is connected to the first control chip, and an output terminal of the second OR gate circuit is connected to the second drive circuit;

a first input terminal of the third OR gate circuit is connected to the second control chip, and an output terminal of the third OR gate circuit is connected to a reset terminal of the first control chip; and a first input terminal of the fourth OR gate circuit is connected to the first control chip, and an output terminal of the fourth OR gate circuit is connected to a reset terminal of the second control chip.

7. The drive apparatus according to claim 6, wherein both a third input terminal of the first OR gate circuit and a third input terminal of the second OR gate circuit are connected to the watchdog chip; and both a second input terminal of the third OR gate circuit and a second input terminal of the fourth OR gate circuit are connected to the watchdog chip.

8. The drive apparatus according to claim 4, wherein the reset shutdown circuit comprises: a first AND gate circuit, a second AND gate circuit, a third AND gate circuit, a fourth AND gate circuit, a fifth AND gate circuit, a sixth AND gate circuit, a seventh AND gate circuit, an eighth AND gate circuit, a first inverter, and a second inverter;

a first input terminal of the first AND gate circuit is connected to the first control chip, a second input terminal of the first AND gate circuit is connected to the first control chip, and an output terminal of the first AND gate circuit is connected to an input terminal of the first inverter;

a first input terminal of the second AND gate circuit is connected to the watchdog chip, a second input terminal of the second AND gate circuit is connected to an output terminal of the second inverter, and an output terminal of the second AND gate circuit is connected to a reset terminal of the first control chip;

a first input terminal of the third AND gate circuit is connected to the first control chip, a second input terminal of the third AND gate circuit is connected to the output terminal of the second inverter, and an output terminal of the third AND gate circuit is connected to a first input terminal of the fourth AND gate circuit;

a second input terminal of the fourth AND gate circuit is connected to the watchdog chip, and an output terminal of the fourth AND gate circuit is connected to the first drive circuit;

a first input terminal of the fifth AND gate circuit is connected to the second control chip, a second input terminal of the fifth AND gate circuit is connected to the second control chip, and an output terminal of the fifth AND gate circuit is connected to an input terminal of the second inverter;

a first input terminal of the sixth AND gate circuit is connected to the watchdog chip, a second input terminal of the sixth AND gate circuit is connected to an output terminal of the first inverter, and an output terminal of the sixth AND gate circuit is connected to a reset terminal of the second control chip;

a first input terminal of the seventh AND gate circuit is connected to the second control chip, a second input terminal of the seventh AND gate circuit is connected to the output terminal of the first inverter, and an output terminal of the seventh AND gate circuit is connected to a first input terminal of the eighth AND gate circuit; and a second input terminal of the eighth AND gate circuit is connected to the watchdog chip, and an output terminal of the eighth AND gate circuit is connected to the second drive circuit.

* * * * *